United States Patent
Okamoto et al.

(10) Patent No.: US 7,211,752 B2
(45) Date of Patent: May 1, 2007

(54) METHOD FOR SETTING INNER PRESSURE OF VEHICULAR EXTERNAL AIRBAG, AND VEHICULAR EXTERNAL AIRBAG SYSTEM

(75) Inventors: Yutaka Okamoto, Wako (JP); Yuji Kikuchi, Wako (JP); Koichi Kamiji, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 11/338,379

(22) Filed: Jan. 24, 2006

(65) Prior Publication Data

US 2006/0163852 A1   Jul. 27, 2006

(30) Foreign Application Priority Data

Jan. 26, 2005  (JP)  ............................. 2005-018852
Sep. 20, 2005  (JP)  ............................. 2005-272341

(51) Int. Cl.
   *H01H 9/00*   (2006.01)
(52) U.S. Cl. ............................. 200/61.58 R; 200/329; 180/274; 180/282; 280/730.1; 280/735; 280/739
(58) Field of Classification Search ......... 200/61.58 R; 180/271, 274, 282; 280/728.1, 730.1, 735, 280/739
   See application file for complete search history.

(56) References Cited

U.S. PATENT DOCUMENTS 6,857,495 B2 * 2/2005 Sawa ......................... 180/274
6,955,238 B2 * 10/2005 Takimoto ..................... 180/274
7,025,164 B2 * 4/2006 Takimoto ..................... 180/274
7,090,243 B2 * 8/2006 Igawa ....................... 280/728.2
7,174,985 B2 * 2/2007 Sawa et al. .................. 180/274

FOREIGN PATENT DOCUMENTS

JP       2004-090812       3/2004

* cited by examiner

*Primary Examiner*—K. Lee
(74) *Attorney, Agent, or Firm*—Rankin, Hill, Porter & Clark LLP

(57) ABSTRACT

When a small-size dummy has collided against a vehicle and once the head of the small-size dummy hits the deployed external airbag at a pre-determined velocity, the inner pressure of the deployed external airbag is set to a characteristic such that the inner pressure takes a predetermined maximum level value capable of not only preventing the dummy from bouncing off the airbag but also preventing the head of the dummy from hitting the bottom of the airbag. When a medium-size dummy has collided against the vehicle, the inner pressure of the deployed external airbag is set to a characteristic such that the inner pressure decreases away from the maximum level value at a predetermined decrease rate to prevent the medium-size dummy from bouncing off the airbag.

4 Claims, 13 Drawing Sheets

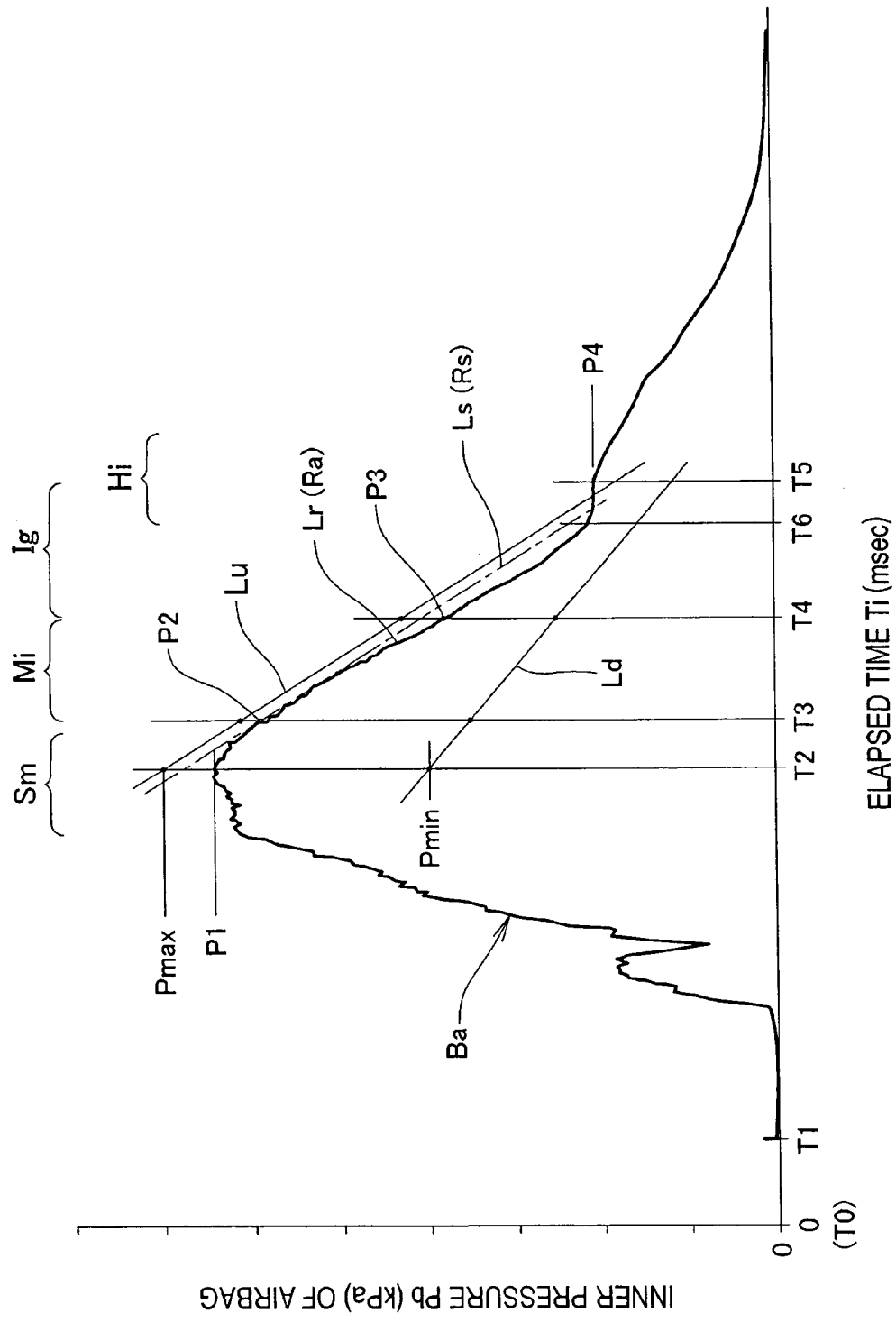

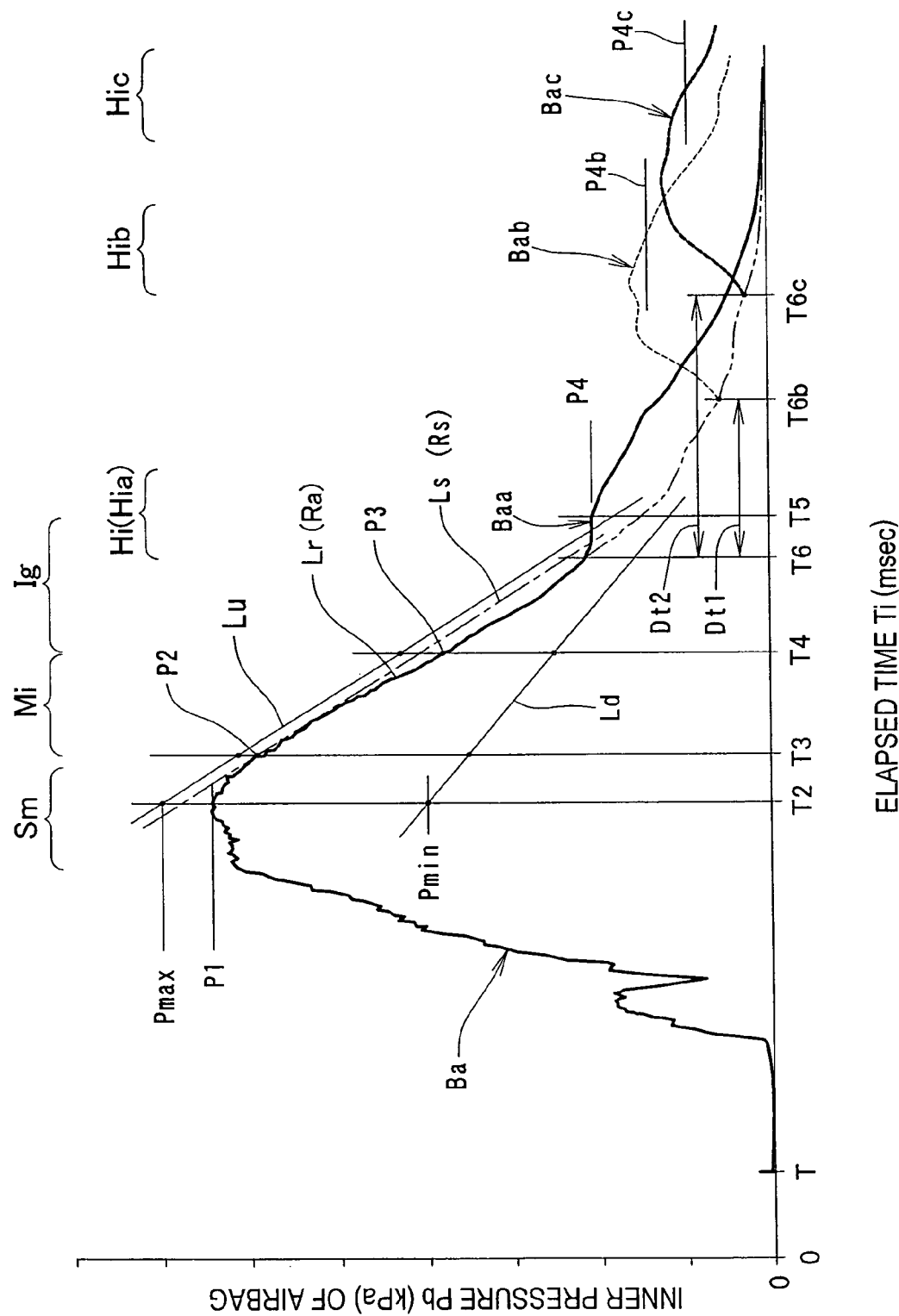

METHOD FOR SETTING INNER PRESSURE OF VEHICULAR EXTERNAL AIRBAG, AND VEHICULAR EXTERNAL AIRBAG SYSTEM

FIELD OF THE INVENTION

The present invention relates to an improved method for setting an inner pressure of a vehicular external airbag inflated and deployed along the outer surfaces of a front windshield etc., and an improved vehicular external airbag system.

BACKGROUND OF THE INVENTION

Collision of an external obstacle or external object, such as a pedestrian, against a front portion of a vehicle may take various forms depending on the case. It is generally conceivable that an external object first collides against a front bumper or the like of a vehicle (this first collision will hereinafter be referred to as "primary collision") and subsequently collides against another portion of the vehicle (this subsequent collision will hereinafter be referred to as "secondary collision").

Japanese Patent Laid-Open Publication No. 2004-90812, for example, discloses a vehicular external airbag apparatus and method for deploying the vehicular external airbag, in accordance with which the external airbag is inflated and developed or deployed, upon primary collision of an external obstacle or object, to cover the front outside of the vehicle, such as the outer surfaces of the front pillars and front windshield, so as to lessen or cushion an impact caused by a secondary collision of the external object against the front outside of the vehicle.

FIGS. 10 and 11 are explanatory of the vehicular external airbag apparatus and method for deploying the vehicular external airbag disclosed in the above-identified No. 2004-90812 publication. Specifically, FIG. 10 shows a vehicle 500 equipped with the vehicular external airbag apparatus 510, and FIG. 11 is a sectional side view of the vehicular external airbag apparatus 510.

The conventional vehicular external airbag apparatus 510 includes an external airbag 511 to be inflated and deployed along the outer surfaces of the front windshield 501 and other part adjoining the front windshield 501 of the vehicle 500 (see FIG. 10), an inflator 512 for producing high-pressure gas to inflate the airbag 511, and a storage case 513 for storing the airbag 511 in a folded position and storing the inflator 512 as well.

Upon primary collision of an external object (not shown) against a front bumper 502 of the vehicle 500, the high-pressure gas is produced from the inflator 512 to inflate and deploy the airbag 511 along the outer surfaces of the front windshield 501 and other part adjoining the front windshield 501, so as to cushion an impact caused by a secondary collision of the external object against another portion of the vehicle 100.

Further, as illustrated in FIG. 11, the airbag 511 has a vent hole 514, and an airbag pressure release mechanism 515 that lets out the gas from the airbag 511 to the atmosphere through the vent hole 514 once the inner pressure of the airbag 511 reaches a predetermined level value. When the inner pressure of the airbag 511 has reached the predetermined level value, for instance, as the external object collides and presses against the deployed airbag 511, the airbag pressure release mechanism 515 causes the vent hole 514 to open. As a consequence, the gas within the airbag 511 is allowed to escape through the vent hole 514 to the atmosphere.

Form of the secondary collision of the external object against the outer surface of the vehicle 500 varies from one case to another. For example, a position and time at which the external object comes into the secondary collision against the inflated and deployed airbag 511 differ depending on the size (weight included) of the external object and colliding velocity of the external object coming into the secondary collision; for example, if pedestrians are assumed as possible colliding external objects, each pedestrian has a different height and weight. As generally known, the colliding velocity at which a relatively tall pedestrian comes into the secondary collision is lower than the colliding velocity at which a shorter pedestrian comes into the secondary collision, and hence the time point at which the tall pedestrian comes into the secondary collision tends to be later than the time point at which the shorter pedestrian comes into the secondary collision.

For such reasons, it is preferable that arrangements be made for sufficiently cushioning the impact on the external object irrespective of the size (weight included) and colliding velocity of the external object coming into the secondary collision.

As also generally known, the time point at which an external object comes into the secondary collision after the primary collision against a vehicle differs depending on a traveling velocity of the vehicle. Namely, the lower the traveling velocity of the vehicle, the later the time point of the secondary collision. Thus, it is also preferable that arrangements be made for sufficiently cushioning the impact on the external object irrespective of the traveling velocity of the vehicle at the time point of the primary collision.

SUMMARY OF THE INVENTION

In view of the foregoing prior art problems, it is an object of the present invention to provide a technique which can sufficiently lessen or cushion an impact on an external object, coming into a secondary collision against a vehicular external airbag inflated and deployed along the outer surfaces of a front windshield and other part adjoining the front windshield of a vehicle, irrespective of the size and colliding velocity of the external object.

It is another object of the present invention to provide a technique which can sufficiently cushion an impact on an external object, colliding against a vehicle, irrespective of the traveling velocity of the vehicle at the time point of the collision.

It is still another object of the present invention to provide a technique which can set optimal inner pressure control characteristics for a vehicular external airbag, with a simple procedure, during development stages of a vehicular external airbag apparatus.

According to one aspect of the present invention, there is provided an improved method for setting, by use of a plurality of dummies of different sizes, an inner pressure of a vehicular external airbag having been deployed along the outer surface of at least a front windshield of a vehicle, and the method comprises: when a small-size dummy of the plurality of dummies collided against the vehicle and once a head of the small-size dummy hits the external airbag at a predetermined velocity, a first step of setting the inner pressure of the deployed external airbag to a characteristic such that the inner pressure takes a predetermined maximum level value capable of not only preventing the small-size dummy from bouncing off the external airbag but also preventing the head of the small-size dummy from hitting a bottom of the external airbag; and when a medium-size dummy of the plurality of dummies collided against the vehicle, a second step of setting the inner pressure of the deployed external airbag to a characteristic such that the inner pressure decreases away from the predetermined maximum level value at a pre-determined decrease rate to prevent the medium-size dummy from bouncing off the external airbag. The characteristics, to which the inner pressure have been set by the first step and second step, are set as inner pressure control characteristics for the vehicular external airbag.

In the present invention, the inner pressure control characteristics for the airbag inflated and deployed along the outer surfaces of the front windshield and parts adjoining the front windshield are set in the following manner, using the dummies simulative of external objects (i.e., pedestrians) of various sizes colliding against the vehicle.

Namely, when the small-size dummy has collided against the vehicle ("primary collision") and once the head of the small-size dummy hits the external airbag ("secondary collision") at a predetermined velocity, the present invention sets, at the first step, the inner pressure of the deployed external airbag to such a characteristic as to cause the inner pressure to take the predetermined maximum level value that can prevent the small-size dummy from bouncing off the external airbag but also prevent the head of the small-size dummy from hitting the bottom of the external airbag and hence the vehicle body beneath the airbag.

It has been known or confirmed previously that the head of the small-size dummy, having a small height and weight, comes into the secondary collision against the vehicle at a predetermined velocity. By setting the inner pressure of the external airbag to the aforementioned characteristic, it is possible to sufficiently lessen or cushion the impact on the small-size dummy when the head of the dummy has collided against the vehicle.

The medium-size dummy is taller and heavier than the small-size dummy, and thus, the time point when the medium-size dummy hits the airbag tends to be later than the time point when the small-size dummy hits the airbag. In view of such a tendency, the present invention sets, at the second step, the inner pressure of the deployed external airbag to such a characteristic as to cause the inner pressure to decrease, away from the maximum level value, at a predetermined decrease rate to prevent the medium-size dummy from bouncing off the external airbag, so that it is possible to sufficiently lessen the impact on the medium-size dummy as well.

In this manner, the method of present invention can afford the superior, unique benefit that it can sufficiently cushion the impact on both of the small- and medium-size dummies (pedestrian dummies) irrespective of the size and colliding velocity of the dummies coming into the secondary collision against the vehicle.

The optimal characteristics, to which the inner pressure have been set by the first step and second step, are set as (target) inner pressure control characteristics for subsequent use in controlling the inner pressure of the vehicular external airbag when an actual external object, such as a pedestrian has collided against the vehicle during travel of the vehicle on a road or the like.

Further, the present invention allows the inner pressure of the airbag to be set appropriately with a simple procedure during the development stages of the vehicular external airbag and deploying method for the external airbag. Namely, individual inner pressure settings or specifications can be set easily with minimized trial and error during tests using the pedestrian-simulating dummies, for each of various vehicles.

Preferably, the method of the present invention further includes a third step of, when a large-size dummy of the plurality of dummies, greater in size than the small- and medium-size dummies, has collided against the vehicle and once the head of the large-size dummy hits the external airbag at a predetermined velocity, setting the inner pressure of the deployed external air bag to a characteristic such that the inner pressure is kept, for a pre-determined time period, at a predetermined level value that is smaller than the maximum level value and capable of not only preventing the large-size dummy from bouncing off the external airbag but also preventing the head of the large-size dummy from hitting the bottom of the external airbag. The characteristic, to which the inner pressure has been set by the third step, is set as another inner pressure control characteristic for the external vehicle.

The large-size dummy is taller and heavier than the medium-size dummy, and thus, the time point when the large-size dummy hits the airbag tends to be later than the time point when the medium-size dummy hits the airbag. In view of such a tendency, the present invention keeps the inner pressure at a predetermined low level value and can thereby sufficiently lessen the impact on the large-size dummy having hit the airbag. With the aforementioned arrangements, the method of the present invention can versatilely and sufficiently lessen the impact on all of the small-, medium- and large-size dummies as dummy external objects. Thus, the present invention can sufficiently lessen the impact on various external objects even where there exist great differences in size and colliding velocity among the external objects.

According to another aspect of the present invention, there is provided a vehicular external airbag system, which comprises: an inner pressure control characteristic setting unit storing therein predetermined pressure control characteristics set in advance in the same manner as described above in relation to the method of the present invention and intended to control an inner pressure of a vehicular external airbag having been deployed along the outer surface of at least a front windshield of the vehicle; and a vehicular external airbag apparatus. In the system, the vehicular external airbag apparatus comprises: the external airbag; an inflator for inflating and deploying the external airbag upon detection of a collision of an external object against the vehicle; and a control section adapted to control the inner pressure of the external airbag, via the inflator, in accordance with the inner pressure control characteristics stored in the inner pressure control characteristic setting unit.

When a small-size external object has collided against the vehicle and once a part of the small-size external object hits the external airbag at a predetermined velocity, the control section of the vehicular external airbag apparatus performs first control, in accordance with the inner pressure control characteristics stored in the inner pressure control characteristic setting unit, such that the inflator is ignited at predetermined first timing and the inner pressure of the deployed external airbag takes a predetermined maximum level value capable of not only preventing the small-size external object from bouncing off the external airbag but also preventing the part of the small-size external object from hitting a bottom of the external airbag.

It has been known or confirmed previously that the part of the small-size external object, having a small height and weight, comes into the secondary collision against the vehicle at a predetermined velocity. By the control section performing the first control in accordance with the inner pressure control characteristics, stored in the inner pressure control characteristic setting unit, so that the inner pressure takes the pre-determined maximum level value, it is possible to sufficiently lessen or cushion the impact on the small-size external object.

When a large-size external object, greater in size than the small-size external object, has collided against the vehicle and once a part of the large-size external object hits the external airbag at a predetermined velocity, the control section performs second control, in accordance with the inner pressure control characteristics stored in the inner pressure control characteristic setting unit, such that the inflator is ignited at predetermined second timing later than the first timing and the inner pressure is kept, for a predetermined time period, at a predetermined level value smaller than the maximum level value and capable of not only preventing the large-size external object from bouncing off the external airbag but also preventing the part of the large-size external object hitting the bottom of the external airbag.

The medium- and large-size external objects are each taller and heavier than the small-size external object. Thus, the time point when the medium-size or large-size external object hits the airbag tends to be later than the time point when the small-size external object hits the airbag. In view of such a tendency, the control section starts keeping the inner pressure at the predetermined low level value at a time point later than the time point when the small-size external object collides against the vehicle, which can thereby sufficiently lessen the impact on the medium- and large-size external objects having hit the airbag.

In the above-described manner, the present invention can sufficiently lessen the impact on all of the small-, medium- and large-size external objects. Thus, the present invention can sufficiently lessen the impact on every possible colliding external object even where there exist great differences in size and colliding velocity among the external objects coming into the secondary collision against the inflated and deployed airbag.

Preferably, when a traveling velocity of the vehicle detected when the external object has collided against the vehicle is lower than a pre-determined reference velocity, the control section of the airbag apparatus controls the second activation (e.g., ignition) timing to be delayed by a predetermined time as compared to when the traveling velocity of the vehicle detected is not lower than the predetermined reference velocity.

Because only the second timing is varied in accordance with the detected traveling velocity, sufficient protection performance of the vehicular external airbag apparatus of the present invention can be secured reliably not only during high-velocity travel but also during low-velocity travel. Namely, even during low-velocity travel, the desired second inner pressure characteristic for the deployed airbag can be maintained.

Further, because the first ignition timing is constant irrespective of the traveling velocity of the vehicle, the airbag can be promptly inflated and deployed upon the initial or primary collision of the external object against the vehicle so that desired inner pressure characteristics can be secured. Therefore, irrespective of behavior of the external object coming into the secondary collision, sufficient protection performance of the vehicular external airbag apparatus of the invention can be secured reliably.

As apparent from the foregoing, the impact on every external object colliding against the vehicle can be sufficiently lessened irrespective of the traveling velocity at the time of the primary collision of the external object against the vehicle.

BRIEF DESCRIPTION OF THE DRAWINGS

Certain preferred embodiments of the present invention will hereinafter be described in detail, by way of example only, with reference to the accompanying drawings, in which:

FIG. 6 is a diagram explanatory of inner pressure control characteristics for the vehicular external airbag set via the inner pressure control characteristic setting unit of FIG. 3;

FIG. 8 is a diagram explanatory of inner pressure characteristics of the vehicular external airbag actually achieved through control by a control section of the vehicular external airbag apparatus;

DETAILED DESCRIPTION OF THE PREFERRED EMBODIMENTS

It should be noted that the terms "front", "rear", "left", "right", "upper", "lower", etc. used herein represent various directions as viewed by a human operator or driver of a vehicle.

Figure 1:
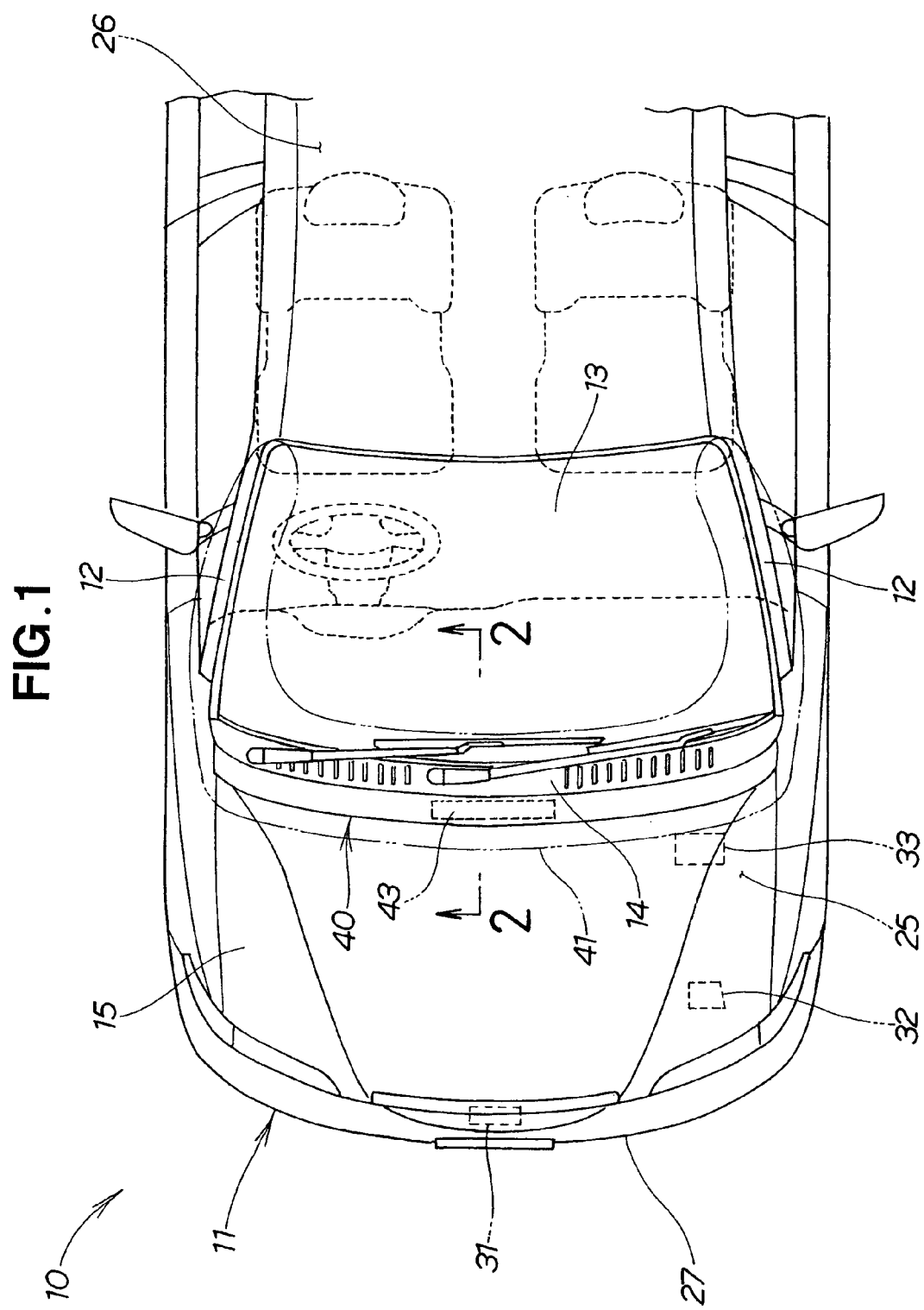
FIG. 1 is a plan view showing a front half section of a vehicle equipped with a vehicular external airbag apparatus which constitutes a vehicular external airbag system of the present invention together with an inner pressure control characteristic setting unit.
Figure 2:
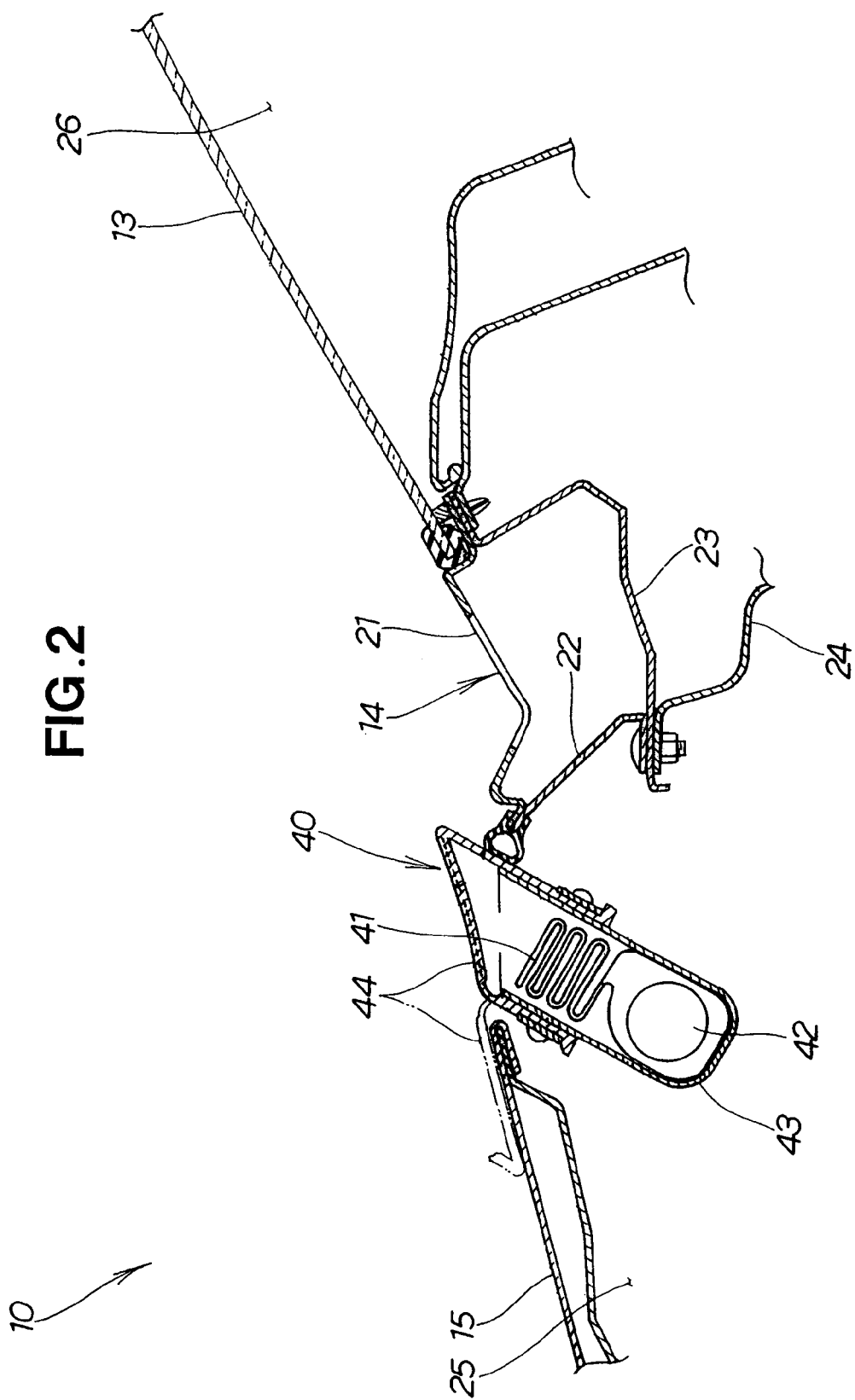
FIG. 2 is a sectional view taken along the line 2—2 of FIG. 1.
Figure 3:
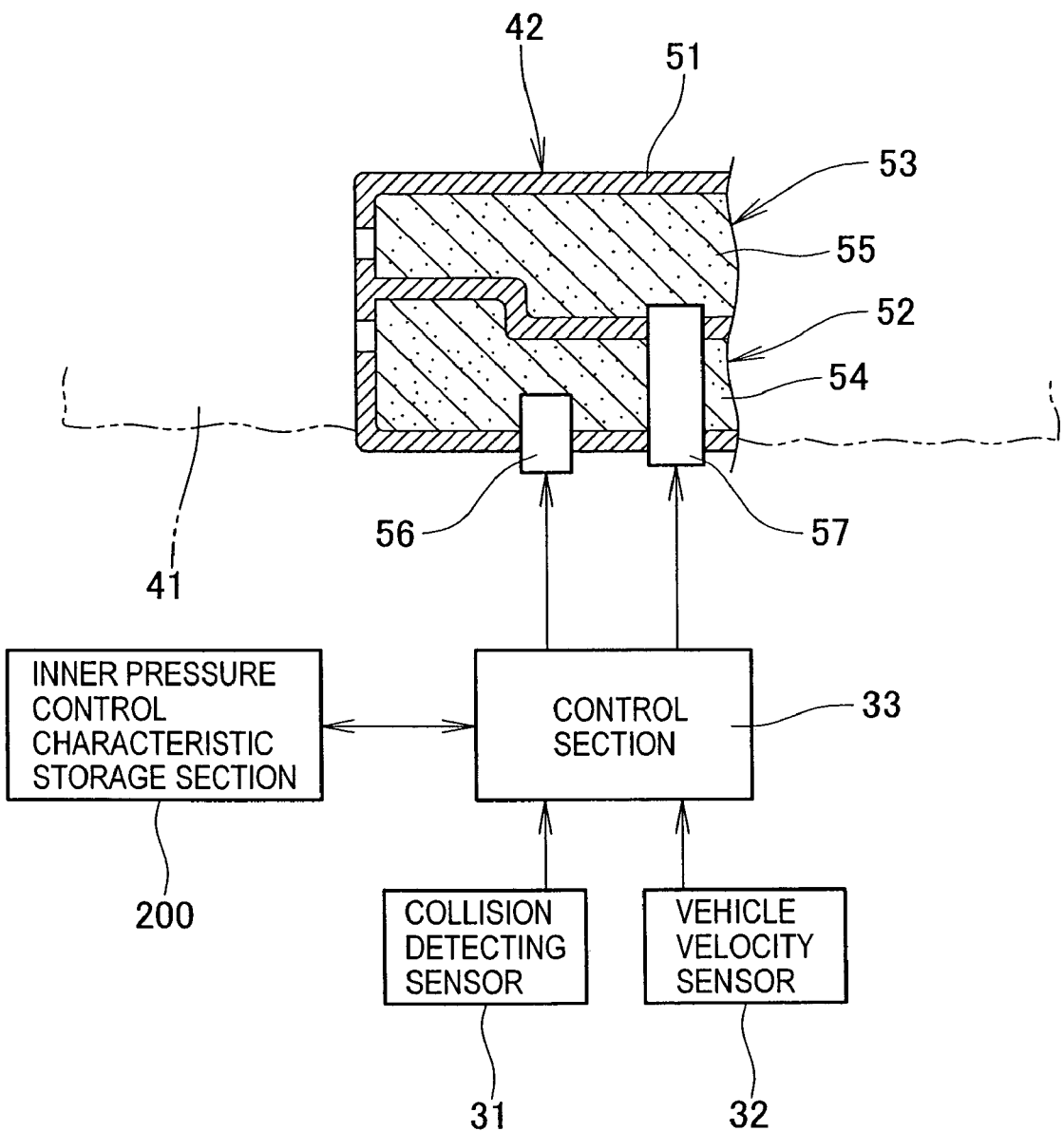
FIG. 3 is a block diagram showing an example construction of an inflator employed in the vehicular external airbag apparatus of FIG. 1.

FIG. 1 is a plan view showing a front half section of a vehicle equipped with a vehicular external airbag apparatus which constitutes a vehicular external airbag system of the present invention together with an inner pressure control characteristic setting unit 200 (FIG. 3). FIG. 2 is a sectional view taken along the line 2—2 of FIG. 1. The inner pressure control characteristic setting unit 200 may be implemented by a computer.

As shown in FIG. 1, the vehicle 10 includes a front windshield 13 provided between front left and right pillars 12, a cowl top 14 extending forward from a lower end portion of the front windshield 13, and a hood 15 disposed forwardly of the cowl top 14. The hood 15 has is a front-opening hood which has left and right rear end portions openably mounted on a vehicle body 11. Also, the hood 15 is lockable at its front end portion to the vehicle body 11 by means of a not-shown hood lock.

As shown in FIG. 2, the cowl top 14 is a duct-shaped member extending in a transverse or width direction of the vehicle 10, and it includes a plate-shaped, external-air introducing grill 21 extending forwardly and downwardly from the lower end of the front windshield 13, a front or outer cowl top portion 22, and a rear or inner cowl top portion 23. Front engine room 25 and rear vehicle compartment 26 can be partitioned off from each other by means of a dashboard 24 extending downward from the lower end of the cowl top 14.

As seen in FIGS. 1 and 2, the vehicle 10 includes an external-object-collision detecting sensor 31 disposed on a front end portion (e.g., front bumper 27) of the vehicle body 11, a vehicle velocity sensor 32 for detecting a traveling velocity of the vehicle 10, and a control section 33 that may be implemented by a microcomputer. The vehicle 10 also includes, under a rear portion of the hood 15, a vehicular external airbag apparatus 40 constructed according to the present invention.

The external-object-collision detecting sensor 31 is, for example, in the form of an acceleration sensor. The vehicular external airbag apparatus 40 is constructed to inflate and develop or deploy an airbag 41 along the outer surfaces of the front windshield 13 and left and right front pillars 12 adjoining the opposite sides of the front windshield 13.

As seen from FIG. 2, the vehicular external airbag apparatus 40 of the present invention comprises the airbag 41 inflatable and deployable along the outer surfaces of the front windshield 13 and left and right front pillars 12 disposed at the opposite sides of the front windshield 13, an inflator 42 for producing high-pressure gas to inflate the airbag 41, and a retainer 43 for storing the airbag 41 in a folded position along with the inflator 42, and a cover 44 covering an upper opening of the retainer 43.

FIG. 3 is a block diagram showing an example construction of the inflator 42 employed in the vehicular external airbag apparatus of FIG. 1. As shown, the inflator 42 includes a case 51 divided into first and second chambers 52 and 53 which are filled with gas generating agents 54 and 55, respectively, and first and second igniters 56 and 57 for igniting the respective gas generating agents 54 and 55 independently of each other.

Once the external-object-collision detecting sensor 31 detects that an external object has collided against a front portion of the vehicle 11, the control section 33, in response to a collision detection signal output from the sensor 31, first generates an ignition (or activation) signal to be supplied to the first igniter 56 and then, upon passage of a predetermined time, generates an ignition signal to be supplied to the second igniter 57.

Consequently, the first igniter 56 ignites the gas generating agent 54 in the first chamber 52, and thus, a great amount of the high-pressure gas is produced from the ignited gas generating agent 54 so that the airbag 41 is inflated and deployed rapidly. After that, the second igniter 57 ignites the gas generating agent 55 in the second chamber 53, and thus, a great amount of high-pressure gas is produced from the ignited gas generating agent 55 so that the deployed airbag 41 is kept at a preset inner pressure level.

Further, a velocity of the vehicle 10 at the time point when the external object has collided against the vehicle 10, i.e. when the external-object-collision detecting sensor 31 has detected the collision of the external object, is detected via the vehicle velocity sensor 32. In response to a velocity detection signal output from the vehicle velocity sensor 32, the control section 33 controls timing at which the ignition signal should be supplied to the second igniter 57, as will be later detailed.

Figure 4:
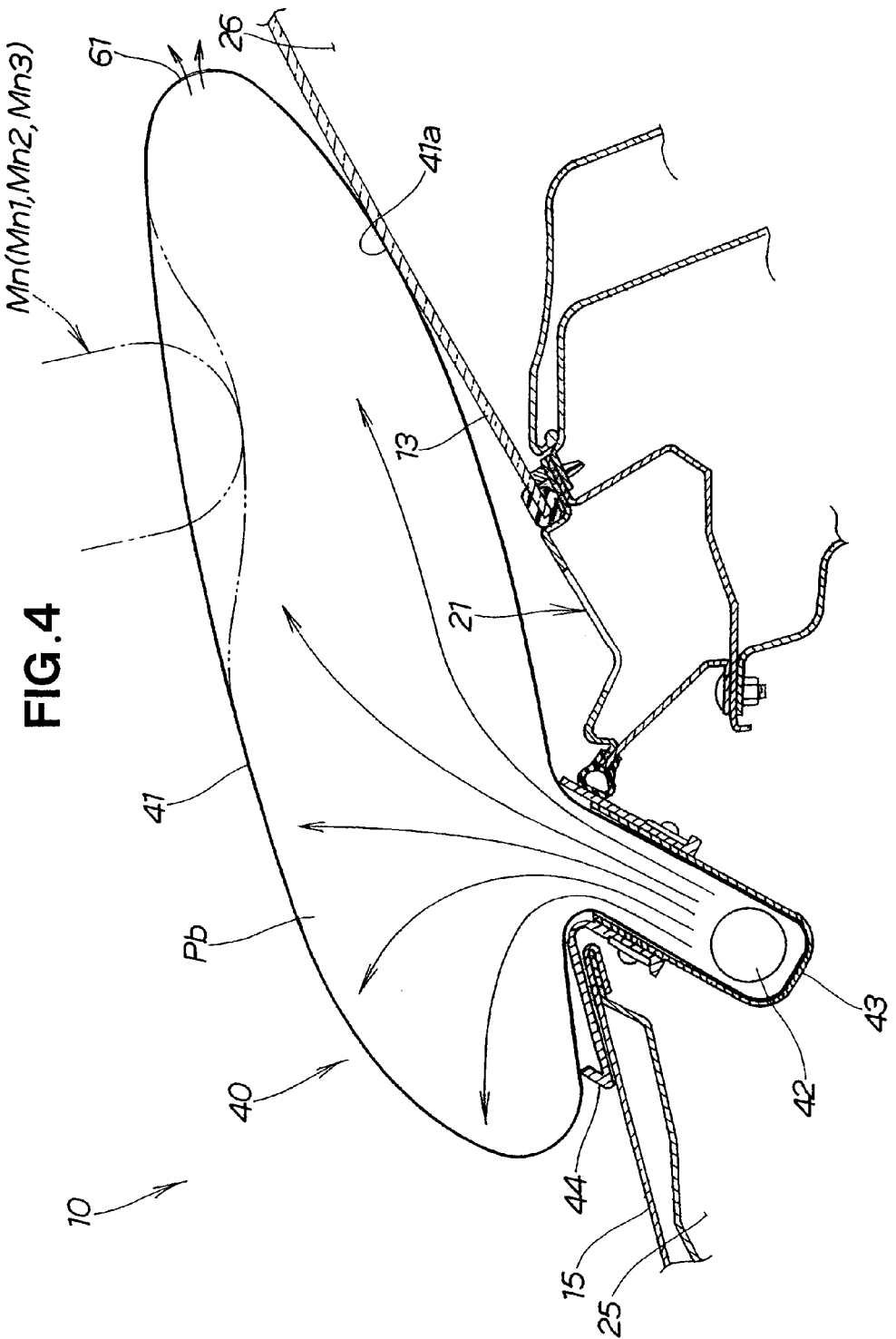
FIG. 4 is a view explanatory of a manner in which a vehicular external airbag is inflated and deployed in the vehicular external airbag apparatus.

With reference to FIGS. 1 and 4, the following paragraphs describe a manner in which the airbag 41 of the vehicular external airbag apparatus 40 is inflated and deployed under control of the control section 33.

FIG. 4 is a view explanatory of the manner in which the airbag 41 of the vehicular external airbag apparatus 40 is deployed, which particularly shows the airbag 41 having been inflated and deployed from the folded position of FIG. 2. Namely, when some external object (e.g., pedestrian) has collided against a front portion, such as the front bumper 27 of FIG. 1, of the vehicle 10, the high-pressure gas is produced from the inflator 42 of FIG. 4 to inflate and deploy the airbag 41 out of the retainer 43, so that the airbag 41 assumes a deployed position as indicated by a phantom line in FIG. 1.

In this way, the external airbag 41 can cover the upper surface of the cowl top 41, lower portion and front surface of the front windshield 13 and the almost entire outer surfaces of the left and right front pillars 12. As a result, the airbag 41 can effectively cushion an impact on the external object Mn (FIG. 4) when the external object, having been thrown up and over the hood 15 by the primary collision against the front portion of the vehicle 10, comes into a secondary collision, to thereby effectively protect the external object.

As illustratively shown in FIG. 4, the external airbag 41 has a vent hole 61 which is a small hole for letting out the gas from the airbag 41 when a predetermined condition has been met. By thus letting out the gas from the airbag 41 to the atmosphere, the inner pressure Pb of the airbag 41 can be lowered in an appropriately-controlled manner. Position of the vent hole 61 in the airbag 41 and size and number of the vent hole 61 are set optimally as will be later described.

According to the present invention, (target) inner pressure control characteristics for the external airbag 41, having been inflated and deployed upon the collision along the outer surfaces of the front windshield 13 and other parts adjoining the front windshield 13, are set and stored in advance by the inner pressure control characteristic setting unit 200 in the following manner, using three different types (particularly, sizes) of dummy pedestrians (i.e., small-, medium- and large-size dummies Mn1, Mn2 and Mn3 specifically illustrated in FIG. 5) as dummy external objects coming into a secondary collision against the airbag 41.

Figure 5:
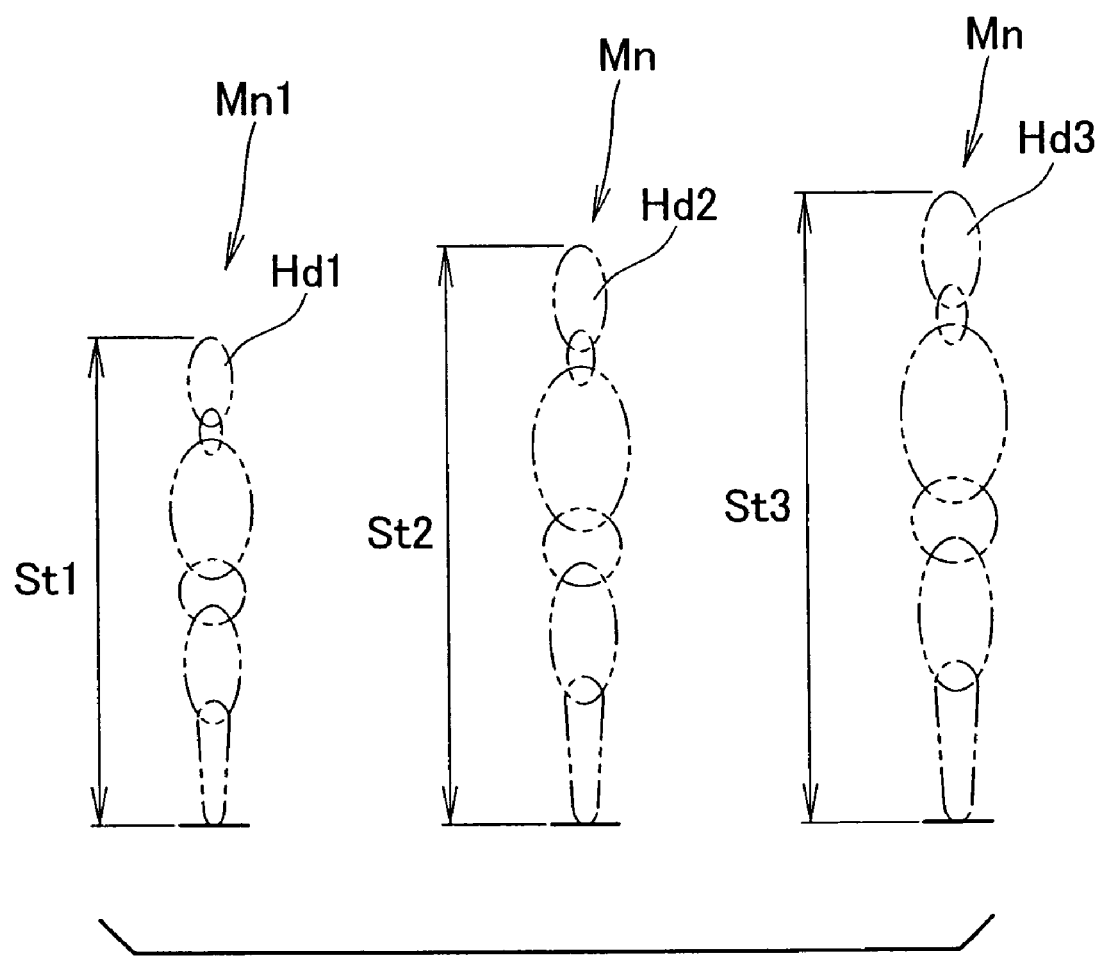
FIG. 5 is a schematic view showing three different dummy pedestrians employed to set inner pressure control characteristics for the external airbag via the inner pressure control characteristic setting unit of FIG. 3.

FIG. 5 is a schematic view showing three different dummy pedestrians (or pedestrian-simulating dummies) employed to set in advance inner pressure control characteristics for the airbag via the inner pressure control characteristic setting unit 200 of FIG. 3.

The small-size dummy Mn1 represents or simulates a smallest pedestrian (whose height St1 is for example 152 cm) that is employed in setting the inner pressure control characteristics for the external airbag 41.

The medium-size dummy Mn2 represents or simulates a medium-size pedestrian (whose height St2 is for example 176 cm) employed in setting the inner pressure control characteristics for the external airbag 41. The medium-size dummy Mn2 is taller and heavier than the small-size dummy Mn1.

The large-size dummy Mn3 represents or simulates a large-size pedestrian (whose height St3 is for example 187 cm) employed in setting the inner pressure control characteristics for the external airbag 41. The large-size dummy Mn3 is taller and heavier than the medium-size dummy Mn2.

The following paragraphs describe the inner pressure setting method of the present invention, with reference to FIG. 6 and FIGS. 3–5.

Note that the inner pressure setting method of the present invention sets in advance optimal airbag inner pressure control characteristics on the assumption that the vehicle 10 has already reached a predetermined reference traveling velocity at the time point of a primary collision of the external object against the vehicle 10.

FIG. 6 is a diagram explanatory of inner pressure control characteristics for the external airbag 41 which are set in advance, via the inner pressure control characteristic unit 200, for subsequent use in controlling the inner pressure of the external airbag 41. In FIG. 6, the horizontal axis represents the elapsed time Ti (msec), and the vertical axis represents the inner pressure level value Pb (kPa) of the airbag 41. More specifically, in FIG. 6, variation in the inner pressure characteristics of the airbag 41 with respect to the elapsed time from the time point when the dummy pedestrian has collided against a front portion of the vehicle 10 (i.e., primary collision time point) is indicated by an inner pressure control characteristic curve Ba. It can be said that the inner pressure control characteristic curve Ba indicates variation in inner pressure characteristics of the airbag 41 provided or achieved in accordance with the inner pressure control characteristics set on the basis of the inventive method. Time point "T0" (msec) represents the primary collision time point when any one of the above-mentioned dummy pedestrians is assumed to have collided against a front portion of the vehicle 10, and "T1"–"T6" represent different elapsed times from the primary collision time point T0.

According to the inner pressure characteristic curve Ba, upon detection, by the above-mentioned external-object-collision detecting sensor 31, of a collision of any one of the dummy pedestrians (i.e., small-, medium- or large-size dummy Mn1, Mn2 or Mn3) at the primary collision time point T0, the first igniter 56 is ignited at the first time point (which may be referred to as "first ignition timing" T1 in response to the detection signal output from the sensor 31 so that the inflator 42 produces the high-pressure gas. Thus, the airbag 41 starts to be inflated by the pressure of the produced gas, so that the inner pressure Pb of the airbag 41 increases.

Note that the "first time point T1" represents a time necessary to ignite the first igniter 56 after the primary collision has been detected by the external-object-collision detecting sensor 31.

Further, according to the inner pressure characteristic curve Ba, after the airbag 41 has been fully inflated and deployed by the inflator 42, the inner pressure Pb of the airbag 41 reaches a predetermined maximum level value P1 at or slightly prior to the second time point T2 and then starts gradually decreasing from the maximum level value P1 after the second time point T2. Namely, the inner pressure Pb of the airbag 41 is held at the maximum level value P1 at least at the second time point T2.

Time zone for which the maximum level value P1 is substantially maintained, i.e. time zone which includes the second time point T2 and regions preceding and following the second time point T2, will hereinafter be referred to as "first impact cushioning zone Sm". Further, a predetermined time zone from the third time point T3, following the second time point T2, to the next fourth time point T4 will hereinafter be referred to as "second impact cushioning zone Mi". Further, a predetermined time zone from the fourth time point T4 to the next fifth time point T5 will hereinafter be referred to as "second ignition zone Ig".

Note that the third, fourth and fifth time points T3, T4 and T5 represent preset elapsed times from the primary collision time point T0.

In the first impact cushioning zone Sm, the maximum level value P1 can be maintained because the amount of the gas produced form the inflator 42 is kept greater than the amount of the gas caused to escape through the vent hole 61 to the atmosphere. Following the first impact cushioning zone Sm, the amount of the gas produced form the inflator 42 is decreased to be less than the amount of the gas caused to escape through the vent hole 61 to the atmosphere, so that the inner pressure Pb gradually decreases.

According to the inner pressure characteristic curve Ba, the inner pressure Pb decreases gradually, away from the maximum level value P1, in the second impact cushioning zone Mi at an actual decrease rate Ra that is relatively great.

Of the inner pressure control characteristic curve Ba, a characteristic curve of the inner pressure Pb decreasing in the second impact cushioning zone Mi will hereinafter be referred to as "actual inner pressure decrease rate curve Lr". The actual inner pressure decrease rate curve Lr passes, at the second time point T2, a range between upper and lower limit level values Pmax and Pmin and slants downwardly in the second impact cushioning zone Mi with a relatively great inclination due to the relatively great decrease rate Ra.

More specifically, the inner pressure Pb at the third time point T3 takes a level value P2 lower than the maximum level value P1. The inner pressure Pb at the fourth time point T4 takes a level value P3 further lower than the level value P2. Therefore, the above-mentioned actual decrease rate Ra can be calculated by the following equation:

$$Ra=(P2-P3)/P2$$

The third time point T3 is when the upper part of the body of the medium-size dummy Mn2, having collided against the vehicle as a dummy colliding external object, is estimated to become stationary after the primary collision at a predetermined reference (or target) high velocity. The fourth time point T4 is when the head Hd2 of the medium-size dummy Mn2 is estimated to hit the airbag 41.

Furthermore, according to the inner pressure characteristic curve Ba, the inner pressure Pb of the airbag 41, gradually decreasing away from the maximum level value P1, substantially maintains a predetermined low pressure level value P4 in a part of the second ignition zone Ig from the sixth time point T6 at least to the fifth time point T5.

The fifth time point T5 is when the head Hd2 of the medium-size dummy Mn2, having hit the airbag 41, is estimated to have been displaced most after the contact with the airbag 41. The sixth time point T6 represents timing for igniting the second igniter 57, which is set at an appropriate point between the fourth time point T4 and the fifth time point T5.

Thus igniting or activating the second igniter 57 allows the inflator 42 to produce the high-pressure gas, by which the inner pressure Pb of the airbag 41 can be substantially kept at the predetermined low level value P4 for a predetermined time period. Predetermined time zone immediately following the sixth time point i.e., second ignition (or activation) timing) T6 will hereinafter be referred to as "third impact cushioning zone Hi".

Namely, the present invention is characterized by optimally setting the inner pressure control characteristics for the inflated and deployed airbag 41 in the following manner, using the dummy pedestrians of different sizes. In other words, the inner pressure Pb of the external airbag 41 is set, in accordance with the inner pressure control characteristics, to respective optimal levels in the first to third impact cushioning zones Sm, Mi and Hi to versatilely protect the small-, medium- and large-size colliding external objects (dummies Mn1, Mn2 and Mn3) as explained in more detail below.

(1) The maximum level value P1 of the inner pressure Pb in the first impact cushioning zone Sm at and around the second time point T2 is set within a range from the predetermined lower limit level value Pmin to the predetermined upper limit level value Pmax (i.e., $Pmin \leq P1 \leq Pmax$).

Namely, the second time point T2 is when the head Hd1 of the small-size dummy Mn1, having collided against the vehicle as a dummy colliding external object, is estimated to hit the airbag 41 at a predetermined reference (or target) high velocity. The lower limit level value Pmin represents a smallest one of inner pressure level values that can appropriately prevent the head Hd1 of the small-size pedestrian-simulating dummy Mn1 from hitting the bottom 41a of the airbag 41 and hence the vehicle body (see FIG. 4) at the second time point T2. The upper limit level value Pmax, on the other hand, represents a greatest one of inner pressure level values which can appropriately prevent the small-size dummy Mn1 from greatly bouncing off the airbag 41 at the second time point T2.

The above-mentioned lower and upper limit level values Pmin and Pmax are determined in view of the shapes, sizes, etc. of the front windshield 13 and adjoining parts and shape, size and degree of deformation, etc. of the external airbag 41.

(2) The actual decrease rate Ra of the inner pressure Pb in the second impact cushioning zone Mi is set greater than a reference decrease rate Rs that is a constant rate preset on the basis of the inner pressure level value P2 at the third time point T3.

As noted above, the inner pressure characteristic curve Ba is set, at the second time point T2, to the relatively great maximum level value P1 so as to reliably protect the head Hd1 of the small-size dummy Mn1. Therefore, the inner pressure level value P2 at the third time point T3 immediately following the second time point T2 is still too great to protect the head Hd2 of the medium-size dummy Mn2. For this reason, the inner preset control characteristics are set to lower the inner pressure Pb by more than a predetermined amount, on the basis of the reference decrease ratio Rs, prior to arrival at the fourth time point T4 when the head Hd2 of the medium-size dummy Mn2 is estimated to hit the airbag 41.

Characteristic of the predetermined reference decrease ratio Rs can be expressed by a linear reference internal-pressure decrease line as depicted at Ls in FIG. 6. Because the actual decrease rate Ra exceeds the reference internal-pressure decrease line Ls, an actual internal-pressure decrease rate line Lr has a greater inclination than the reference internal-pressure decrease line Ls, as seen in FIG. 6.

Inner-pressure decrease rate line Ld of a lower limit reference in the second impact cushioning zone Mi is a reference line that passes the lower limit level value Pmin at the second time point and gradually decreases with the elapsed time Ti. Inner-pressure decrease rate line Lu of an upper limit reference in the second impact cushioning zone Mi is a reference line that passes the upper limit level value Pmax at the second time point and gradually decreases with the elapsed time Ti. These reference inner-pressure decrease rate lines Ls and Ld also represent a reference decrease rate equal to the decrease rate Rs.

(3) The inner pressure Pb in the third impact cushioning zone Hi is set to substantially keep the predetermined low level value P4 that may be referred to as "latter-period reference minimum level value P4". That is, the predetermined time zone following the sixth time point T6 (i.e., third impact cushioning zone Hi) is when the head Hd3 of the large-size dummy Mn3, having collided against the vehicle as a dummy colliding external object, is estimated to hit the airbag 41 at a predetermined reference (or target) high velocity while the inner pressure Pb is still gradually decreasing from the maximum level value P1.

The latter-period reference minimum level value P4 represents an inner pressure level value that can not only prevent the large-size dummy Mn3 from greatly bouncing off the airbag 41 but also prevent the head Hd3 of the large-size dummy Mn3 from hitting the bottom 41a of the airbag 41. The latter-period reference minimum level value P4 is determined in view of the shapes, sizes, etc. of the front windshield 13 and adjoining parts and shape, size and degree of deformation, etc. of the external airbag 41.

Note that the "predetermined time zone following the sixth time point T" is a time range when the head Hd3 of the large-size dummy Mn3 is estimated to hit the external airbag 41.

As apparent from the foregoing, the inner pressure setting method of the present invention is characterized in that, when the small-size pedestrian-simulating dummy Mn1 has collided against the vehicle 10 as a dummy colliding external object and at the time point T2 and once the head Hd1 of the small-size dummy Mn1 hits the deployed airbag 41 at the predetermined reference high velocity, the inner pressure Pb of the external airbag 41 is set to a characteristic such that the inner pressure takes the predetermined maximum level value P1 that can not only prevent the dummy Mn1 from greatly bouncing off the airbag 41 but also prevent the head Hd1 of the dummy Mn1 from hitting the bottom 41a of the airbag 41.

It has previously been known or confirmed that the head Hd1 of the small-size dummy Mn1, having a small height St1 and weight, comes into the secondary collision at a predetermined reference (or target) high velocity. By setting the inner pressure characteristic for the airbag 41 such that the inner pressure Pb when the head Hd1 of the small-size dummy Mn1 has hit the airbag 41 takes the maximum level value P1, it is possible to sufficiently cushion the impact from the secondary collision on the small-size dummy Mn1.

Further, the inner pressure setting method of the present invention is characterized in that, when the medium-size pedestrian-simulating dummy Mn2 has collided against the vehicle as a dummy colliding external object, the inner pressure is set to a characteristic such that it decreases away from the maximum level value P1 at the predetermined decrease rate Ra to effectively prevent the medium-size dummy Mn2 from greatly bouncing off the airbag 41 at the time point T3 when the dummy Mn2 hits the airbag 41 at the predetermined reference high speed.

The medium-size dummy Mn2 is taller and heavier than the small-size dummy Mn1. Thus, the time point (T3) at which the medium-size dummy Mn2 hits the airbag 41 tends to be later than the time point (T2) at which the small-size dummy Mn1 hits the airbag 41. In view of such a tendency, the present invention sets the inner pressure Pb when the medium-size dummy Mn2 hits the airbag 41 to be lower than the above-mentioned maximum level value P1, so that it is possible to sufficiently lessen the impact from the secondary collision on the medium-size dummy Mn2.

In the above-described manner, the airbag inner pressure setting method of the present invention can sufficiently lessen the impact on the small- and medium-size dummies Mn1 and Mn2 as dummy pedestrians (i.e., dummy colliding external objects). Thus, the present invention can sufficiently lessen the impact on both of the small- and medium-size external objects Mn1 and Mn2 irrespective of the sizes and colliding velocities of the external objects Mn1 and Mn2.

Further, the airbag inner pressure setting method of the present invention is characterized in that, when the predetermined large-size pedestrian-simulating dummy Mn3 has collided against the vehicle 10 as a dummy colliding external object, the inner pressure Pb and once the head Hd3 of the dummy Mn3 the deployed airbag at time point T6, the inner pressure of the deployed air bag 41 is set to a characteristic such that it is kept at the low level value P4, lower than the maximum level value P4, capable of not only preventing the large-size dummy Mn3 from greatly bouncing off the airbag 41 but also preventing the head Hd3 of the dummy Mn3 from hitting the bottom 41a of the airbag 41, for a predetermined time period that follows the time point T6 when the head Hd3 of the dummy Mn3 hits the airbag 41.

The large-size dummy Mn3 is taller and heavier than the medium-size dummy Mn2. Thus, the time point (T6) at which the large-size dummy Mn3 hits the airbag 41 tends to be later than the time point (T3) at which the medium-size dummy Mn2 hits the airbag 41. In view of such a tendency, the present invention keeps the inner pressure Pb at the predetermined low level value P4 and can thereby sufficiently lessen the impact on the large-size dummy Mn3 as well.

In the above-described manner, the airbag inner pressure setting method of the present invention can set optimal inner pressure control characteristics capable of versatilely sufficiently lessening the impact on all of the small-, medium- and large-size dummies Mn1, Mn2 and Mn3 as dummy pedestrians (i.e., dummy colliding external objects). Thus, the present invention can sufficiently and reliably lessen the impact on all of the external objects Mn1, Mn2 and Mn3 even where there exist great differences in size and colliding velocity among the colliding external objects Mn1, Mn2 and Mn3.

The following paragraphs describe an example operational sequence for setting the inner pressure control characteristics for the airbag 41 for use in the vehicular external airbag apparatus 40, with reference to FIGS. 7A–7D and FIGS. 3–6. The operational sequence for setting the inner pressure control characteristics for the airbag 41 is based on the assumption that the vehicle 10 has already reached (already become equal to or higher than) the preset reference traveling velocity when some external object has collided against the vehicle 10. The operational sequence is intended to set target inner pressure level values Pb of the airbag 41 and ultimately confirm the protecting performance of the thus-set airbag 41 based on tests using dummy pedestrians, by performing the following simulation operations.

Figure 7A:
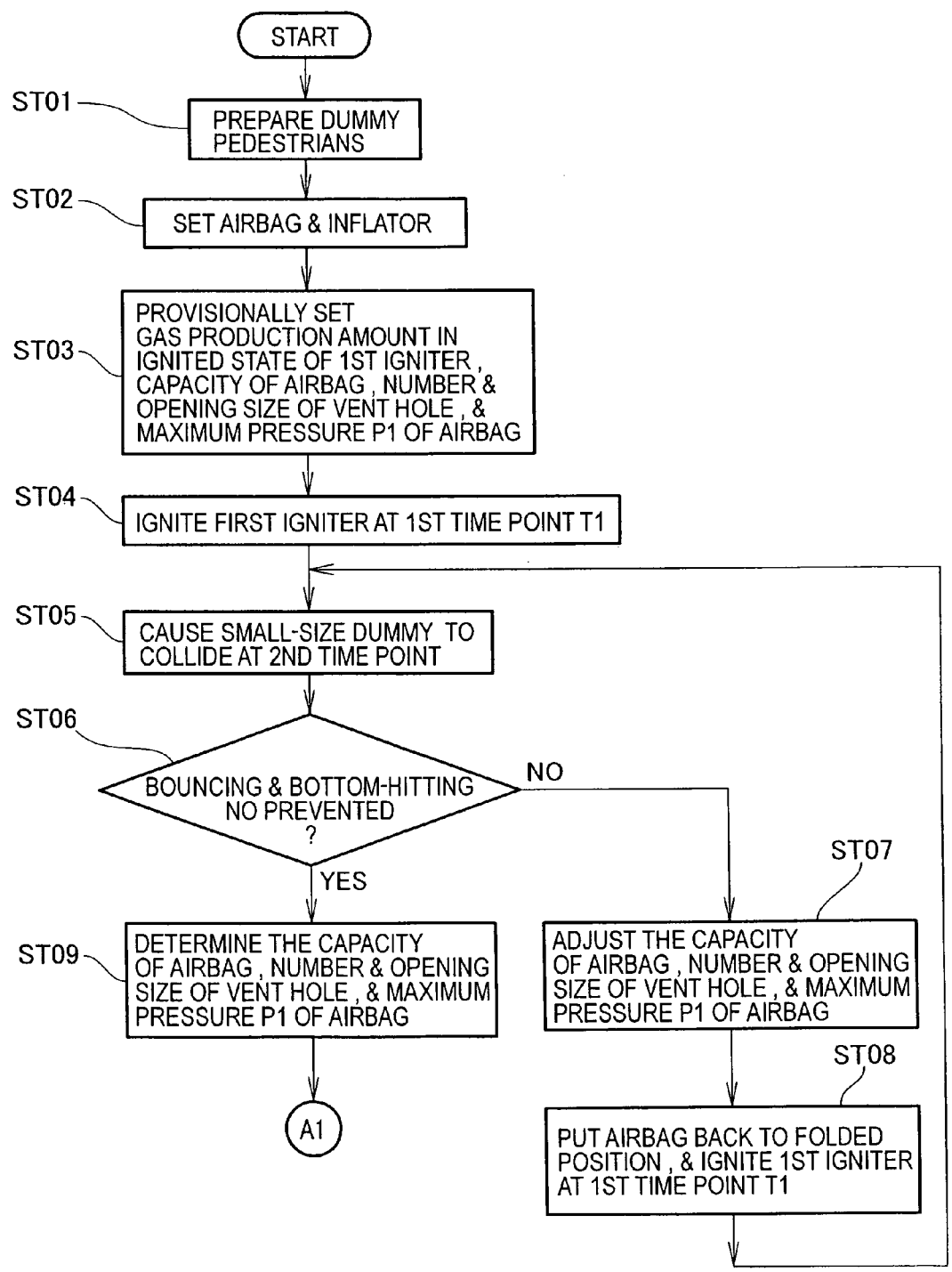
FIG. 7A is a flow chart showing a first portion of an example operational sequence carried out by the inner pressure control characteristic setting unit for setting the inner pressure control characteristics for the vehicular external airbag in accordance with the present invention.

FIG. 7A is a flow chart showing a first portion of the operational sequence carried out by the inner pressure control characteristic setting unit 200 for setting the inner pressure control characteristics for the vehicular external airbag 41 in accordance with the basic principles of the present invention.

Step ST01: Three types of pedestrian-simulating dummies (i.e., small-, medium- and large-size dummies Mn1, Mn2 and Mn3 of FIG. 5) are prepared as dummy external objects to be brought into the secondary collision against the airbag 41.

Step ST02: Airbag (specifically, airbag model) 41 having a predetermined shape and size is set in the folded position in the pre-determined retainer near the front windshield 13 of the vehicle 10, and the inflator 42 is set in the airbag 41.

Step ST03: Gas production amount (flow rate) of the inflator 42 responsive to the ignition or activation of the first igniter 56 is provisionally set. Capacity of the airbag 41 and the number and opening size (diameter) of the vent hole 61 are provisionally set. Maximum level value P1 of the inner pressure Pb of the airbag 41 is provisionally set within the predetermined pressure range of Pmin to Pmax in such a manner that the maximum level value P1 is reached prior to arrival at the second time point T2 (that is an estimated time value).

Step ST04: At a time point when the time value represented by the first time point T1 is estimated to have elapsed from the reference collision time point T0, i.e. at the first time point (i.e., first ignition timing) T1, the first igniter 56 is ignited to inflate the airbag 41.

Step ST05: At the second time point T2, the head of the small-size dummy Mn1 is caused to collide against (i.e., come into the secondary collision against) the airbag 41 at the predetermined reference (or target) high velocity.

Step ST06: A determination is made as to whether the small-size dummy Mn1 could be appropriately prevented from bouncing off the airbag 41 and the head Hd1 of the dummy Mn1 could be appropriately prevented from hitting the bottom 41a of the airbag 41. With a NO determination, the flow branches to step ST07, while, with a YES determination, the flow proceeds to step ST09. For example, a measurement is made of an actual bouncing velocity of the small-size dummy Mn1 relative to the airbag 41, and, if the measured actual bouncing velocity is lower than a preset reference bouncing velocity, then it is determined that the small-size dummy Mn1 could be appropriately prevented from bouncing off the airbag 41.

Further, HIC (Head Injury Criterion) value of the small-size dummy Mn1 is checked, and, if the HIC value is smaller than 1,000, then it is determined that the head Hd1 could be appropriately prevented from hitting the bottom 41a of the airbag 41. The "HIC value" is a value for evaluating safety. The greater the HIC value, the higher the safety; in general, the value "1,000" is used as the safety limit.

Step ST07: Because it has been determined that energy absorbing performance of the airbag 41 does not meet the predetermined requirements, the capacity of the airbag 41 and the number and opening size (diameter) of the vent hole 61 are adjusted, and the maximum level value P1 of the inner pressure Pb of the airbag 41 is adjusted within the predetermined pressure range of Pmin to Pmax.

Step ST08: The airbag 41 is brought back to the original folded position, and then the first igniter 56 is ignited again at the first time point (i.e., first ignition timing) T1 to inflate the airbag 41, after which the flow reverts to step ST05 to repeat the aforementioned operations.

Step ST09: Because it has been determined that the energy absorbing performance of the airbag 41 satisfies the predetermined requirements, the current capacity of the airbag 41 and the current number and opening size (diameter) of the vent hole 61 are determined as appropriate settings. Also, the current maximum level value of the inner pressure Pb of the airbag 41 is determined as an appropriate setting. Then, the flow goes to an out-connector A1

Figure 7B:
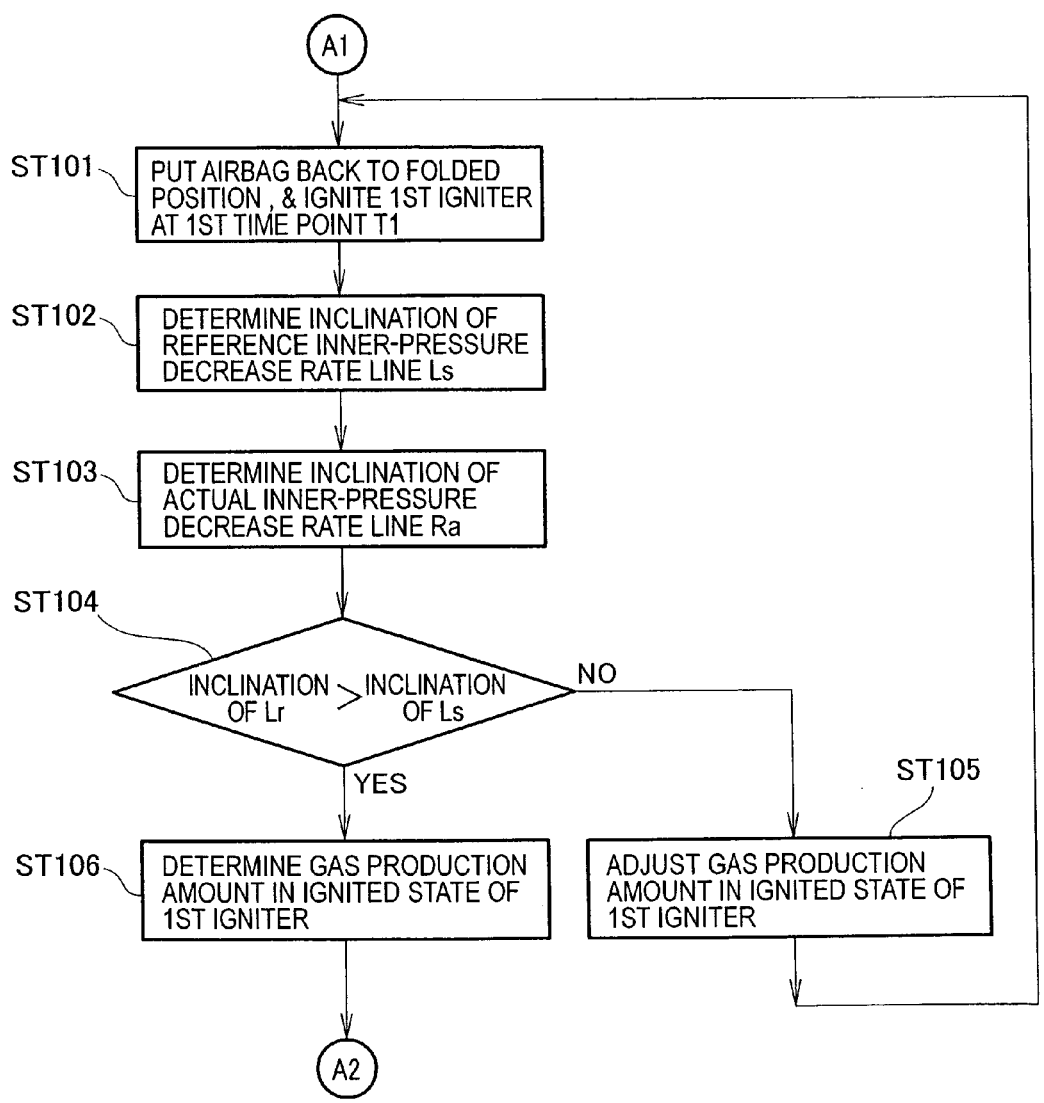
FIG. 7B is a flow chart showing a second portion of the operational sequence for setting the inner pressure control characteristics for the vehicular external airbag in accordance with the present invention.

FIG. 7B is a flow chart showing a second portion of the operational sequence carried out by the inner pressure control characteristic setting unit 200 for setting the inner pressure control characteristics for the vehicular external airbag 41 in accordance with the present invention.

Step ST101: The airbag 41 is brought back to the original folded position, and then the first igniter 56 is ignited again at the first time point (i.e., first ignition timing) T1 to inflate the airbag 41.

Step ST102: Inclination of the reference inner-pressure decrease rate line Ls is determined from the predetermined reference inner-pressure decrease ratio Rs.

Step ST103: Inclination of the actual internal-pressure decrease rate line Lr, i.e. actual decrease rate Ra, is determined. Specifically, the actual decrease rate Ra may be calculated, for example, on the basis of inner pressure level values P2 and P3 measured at the third and fourth time points T3 and T4 (estimated time values), respectively.

Step ST104: A determination is made as to whether the inclination of the actual internal-pressure decrease rate line Lr is greater than the inclination of the reference inner-pressure decrease ratio Rs, i.e. whether the actual decrease rate Ra has exceeded the reference decrease ratio Rs. With a NO determination, the flow branches to step ST105, while, with a YES determination, the flow proceeds to step ST106.

Step ST105: Because it has been determined that the energy absorbing performance of the airbag 41 does not meet the predetermined requirement, the gas production amount (flow rate) of the inflator 42 responsive to the ignition of the first igniter 56 is adjusted to decrease, after which the flow reverts to step ST101 to repeat the aforementioned operations.

Step ST106: Because it has been determined that the energy absorbing performance of the airbag 41 satisfies the predetermined requirement, the currently-set gas production amount (flow rate) of the inflator 42 responsive to the ignition of the first igniter 56 is determined as an appropriate setting, and the flow proceeds to an out-connector A2.

Figure 7C:
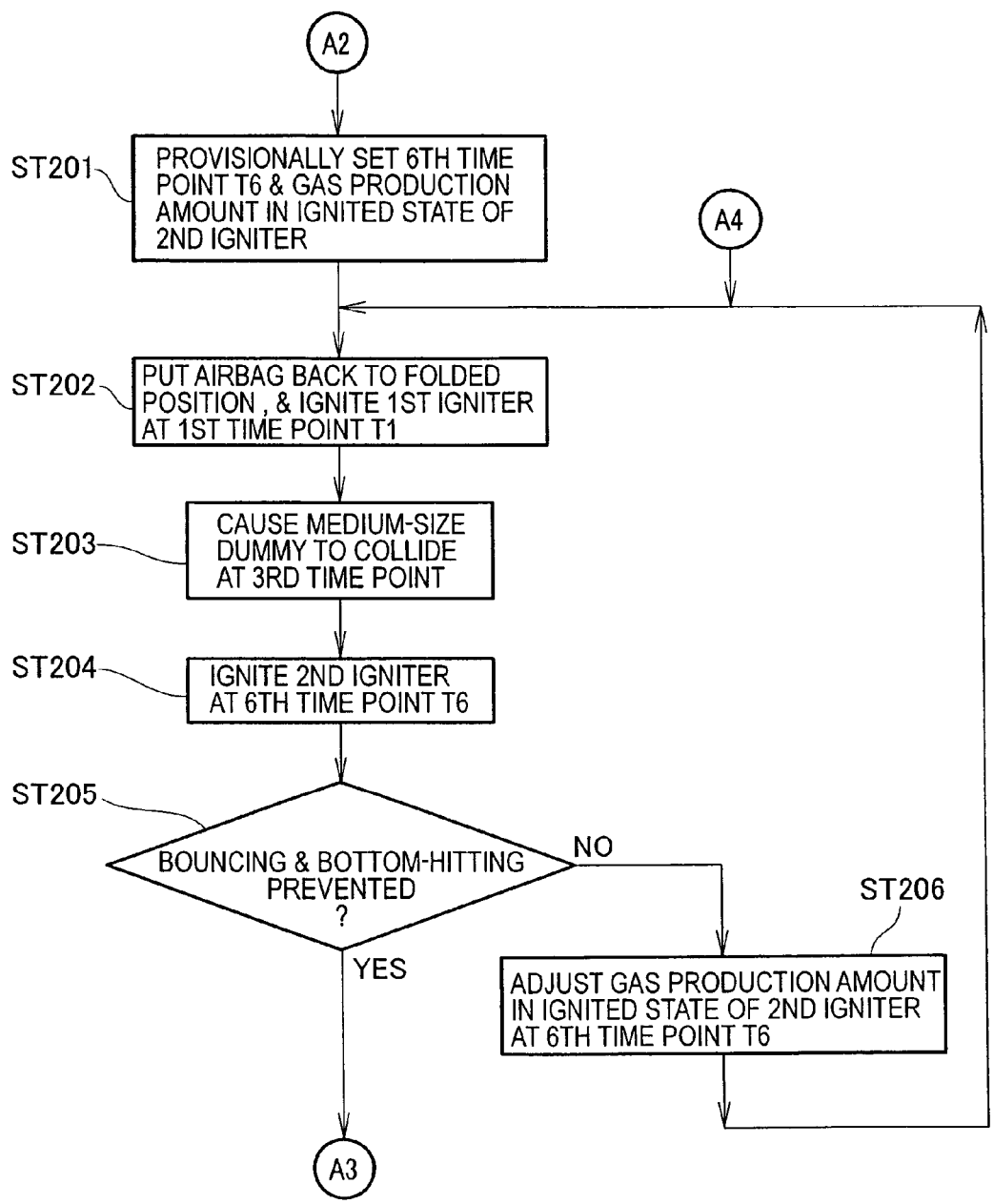
FIG. 7C is a flow chart showing a third portion of the operational sequence for setting the inner pressure control characteristics for the vehicular external airbag in accordance with the present invention.

FIG. 7C is a flow chart showing a third portion of the operational sequence carried out by the inner pressure control characteristic setting unit 200 for setting the inner pressure control characteristics for the vehicular external airbag 41 in accordance with the present invention.

Step ST201: The sixth time point T6 is provisionally set, and a gas production amount (flow rate) of the inflator 42 responsive to the ignition of the second igniter 57 is provisionally set.

Step ST202: The airbag 41 is brought back to the original folded position, and then the first igniter 56 is ignited again at the first time point T1 to inflate the airbag 41.

Step ST203: At the third time point T3, the head of the medium-size dummy Mn2 is caused to collide against (i.e., come into the secondary collision against) the airbag 41 at the above-mentioned pre-determined reference (or target) high velocity.

Step ST204: At the sixth time point T6, the second igniter 57 is ignited to keep the airbag inner pressure Pb at the latter-period minimum level value P4

Step ST205: A determination is made as to whether the medium-size dummy Mn2 could be prevented from bouncing off the airbag 41 and the head Hd2 of the Mn2 could be prevented from hitting the bottom 41a of the airbag 41. With a NO determination, the flow branches to step ST206, while, with a YES determination, the flow proceeds to an out-connector A3. This determination may be made using the same schemes as employed at step ST06.

Step ST206: Because it has been determined that energy absorbing performance of the airbag 41 does not meet the predetermined requirements, the ignition timing of the second igniter 57 (sixth time point or second ignition timing T6) and the gas production amount (flow rate) of the inflator 42 responsive to the ignition of the second igniter 57 are adjusted, after which the flow reverts to step ST202 to repeat the aforementioned operations.

Figure 7D:
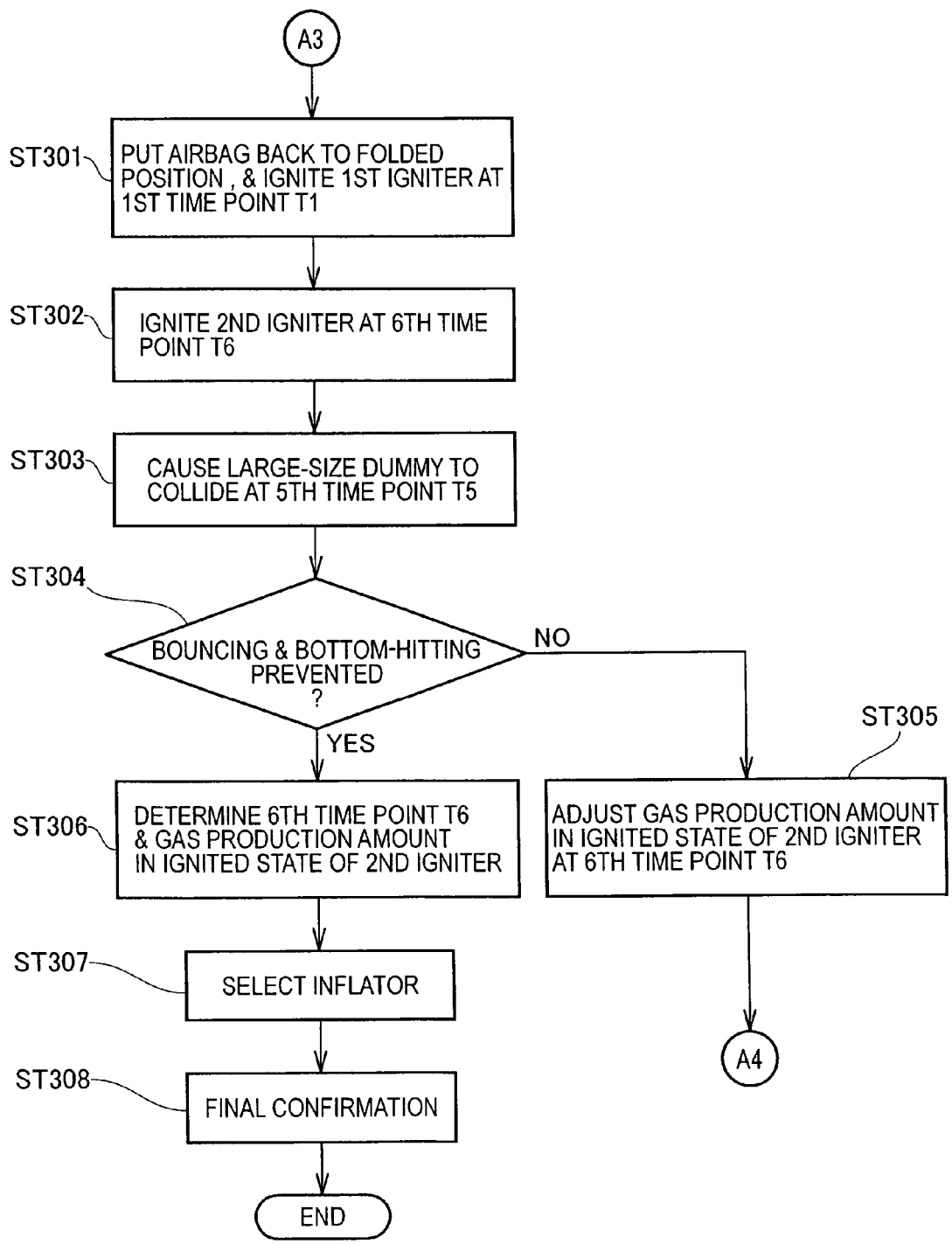
FIG. 7D is a flow chart showing a fourth portion of the operational sequence for setting the inner pressure control characteristics for the vehicular external airbag in accordance with the present invention.

FIG. 7D is a flow chart showing a fourth portion of the operational sequence carried out by the inner pressure control characteristic setting unit 200 for setting the inner pressure control characteristics for the vehicular external airbag 41 in accordance with the present invention.

Step ST301: The airbag 41 is brought back to the original folded position, and then the first igniter 56 is ignited again at the first time point T1 to inflate the airbag 41.

Step ST302: At the sixth time point T6, the second igniter 57 is ignited to keep the airbag inner pressure Pb at the latter-period minimum level value P4

Step ST303: At the fifth time point T5, the head Hd3 of the large-size dummy Mn3 is caused to collide against (i.e., come into the second collision against) the airbag 41 at the above-mentioned predetermined reference (or target) high velocity.

Step ST304: A determination is made as to whether the large-size dummy Mn3 could be prevented from bouncing off the airbag 41 and the head Hd3 of the Mn3 could be prevented from hitting the bottom 41a of the airbag 41. With a NO determination, the flow branches to step ST305, while, with a YES determination, the flow proceeds to step ST306. This determination may be made using the same scheme as employed at step ST06.

Step ST305: Because it has been determined that energy absorbing performance of the airbag 41 does not meet the predetermined requirements, the ignition timing of the second igniter 57 (sixth time point T6) and the gas production amount (flow rate) of the inflator 42 responsive to the ignition of the second igniter 57 are adjusted, and the flow reverts to step ST202 via an in-connector A4 of FIG. 9.

Step ST306: Because it has been determined that energy absorbing performance of the airbag 41 meets the predetermined requirements, the currently-set sixth time point is determined as an appropriate setting, and also the current gas production amount of the inflator 42 responsive to the ignition of the second igniter 57 is determined as an appropriate setting.

Step ST307: Now that respective specifications of the airbag 41, vent hole 61 and inflator 42 have been determined in the aforementioned manner, the inflator 42 satisfying the specifications is selected for use with the external airbag 41.

Step ST308: The protection performance of the airbag 41 with respect to the small-, medium- and large-size dummies Mn1, Mn2 and Mn3 colliding at the above-mentioned predetermined reference high velocities is ultimately confirmed; in this way, the execution of the operational sequence for setting the inner pressure control characteristics for the vehicular external airbag 41 is completed.

As apparent from the foregoing, the present invention defines significant points of the individual specifications separately at four different major stages that are summarized at items (1)–(4) below, and thus, it allows optimal inner pressure control characteristics for the airbag 41 to be set with simple procedures during the development stages of the vehicular external airbag apparatus 40 and external airbag deploying method. Namely, with the present invention, the optimal inner pressure control characteristics for the external airbag 41 can be set with utmost ease, with minimized trial and error, through the tests using the pedestrian-simulating dummies Mn, for each of various vehicles. In addition, the present invention facilitates selection of an appropriate inflator 42 because the inner pressure characteristics of the airbag inner pressure Pb to be targeted are very clear.

Namely, the four different stages are:

(1) the first stage where is set the maximum level value P1 of the airbag inner pressure Pb at the second time point;

(2) the second stage where is set the inclination of the actual internal-pressure decrease rate line Lr over the period from the third time point T3 to the fourth time point T4;

(3) the third stage where is set the sixth time point or ignition timing of the second igniter 57 within the time period from the fourth time point T4 to the fifth time point T5; and (4) the fourth stage where the protection performance of the airbag 41 is ascertained, using the small-, medium- and large-size dummies Mn1, Mn2 and Mn3, under the settings made at the above three stages.

Next, with reference to FIG. 8 and FIGS. 3–5, a description will be given about the inner pressure characteristics of the external airbag 41 in the vehicular external airbag apparatus 40.

FIG. 8 is a diagram showing inner pressure characteristics of the airbag 41 actually obtained through control by the control section 33 in the vehicular external airbag apparatus 40, where the horizontal axis represents the elapsed time Ti (msec) and the vertical axis represents variation in the inner pressure Pb (kPa) of the airbag 41 controlled by the control section 33 in accordance with the inner pressure control characteristics set in advance in the above-described manner.

More specifically, in FIG. 8, an inner pressure characteristic curve Ba, indicated by a heavy, solid line, represents inner pressure characteristics of the airbag 41 actually achieved under control by the control section 33 in accordance with the (target) inner pressure control characteristics set and stored in advance via the inner pressure control characteristic setting unit 200 in the above-described manner, which is substantially similar to the inner pressure characteristic curve Ba of FIG. 6 and thus will not be detailed here to avoid unnecessary duplication.

Time point "T0" (msec) represents a collision time point when any one of the above-mentioned dummies or external objects is assumed to have collided against a front portion of the vehicle 10, and "T1"–"T6" subsequent to the time point T0 represent different elapsed times from the collision time point T0.

The inner pressure characteristic curve Ba indicated by the heavy, solid line in FIG. 8 represents characteristics for the airbag inner pressure Pb on the assumption that the traveling velocity of the vehicle 10 when an external object has collided with the vehicle 10 is equal to or higher than the preset reference velocity, i.e. that the vehicle 10 was traveling at a high velocity, equal to or higher than the preset reference velocity, at the time of the collision of the external object. If the second igniter 57 is not ignited at the sixth time point T6, the characteristics represented by the inner pressure characteristic curve Ba will vary as indicated by a thin two-dot chain line after the sixth time point T6.

Here, the sixth time point T6 may also be referred to as "sixth time point (second ignition timing) T6 to be applied when an external object has collided during high-velocity travel of the vehicle 10". The sixth time point T6 is equal to a first reference time point T6a (Ta=T6a).

The latter-period reference minimum level value P4 at the sixth time point T6 may also be referred to as "latter-period reference minimum level value P4a necessary when an external object has collided during high-velocity travel of the vehicle 10".

Of the inner pressure characteristic curve Ba, a portion generally kept at the latter-period reference minimum level value P4a may be referred to as "inner pressure characteristic curve Baa to be applied when an external object has collided during high-velocity travel of the vehicle 10".

The third impact cushioning zone Hi may also be referred to as "third impact cushioning zone Hia to be applied when an external object has collided during high-velocity travel of the vehicle 10".

As noted earlier, the time point when the external object Mn comes into the secondary collision after the primary collision against the traveling vehicle 10 differs depending the traveling velocity of the vehicle 10. Namely, the lower the traveling velocity of the vehicle, the later the time point of the secondary collision occurrence.

Therefore, there is a possibility that the "third impact cushioning zone Hia to be applied when an external object has collided during high-velocity travel of the vehicle 10" fails to correspond to the time point when the head Hd3 of the large-size external object Mn3 comes into the secondary collision. It is therefore preferable that the inner pressure Pb of the airbag 41 be appropriately set so as to sufficiently lessen the impact on the large-size external object Mn3 even when the time point of the actual secondary collision occurrence has been delayed behind the third impact cushioning zone Hia, In view of the foregoing, the vehicular external airbag apparatus 40 of the present invention is arranged so that, when the traveling velocity of the vehicle 10 at the time point of the collision, against the vehicle 10, of the external object Mn is lower than a preset reference traveling velocity, the sixth time point T6, i.e., timing for issuing the second ignition instruction, is delayed, by a predetermined delay time (i.e., first delay time Dt1 or second delay time Dt2), behind that when the traveling velocity of the vehicle 10 at the time point of the collision is higher than the preset reference traveling velocity.

Namely, although not specifically shown in FIG. 8, when the traveling velocity Vr of the vehicle 10 is lower than a first reference traveling velocity VL1 (Vr<VL1), it is determined that the vehicle 10 is traveling at low velocity. When the traveling velocity Vr of the vehicle 10 is equal to or higher than the first reference traveling velocity VL1 but lower than a second reference traveling velocity VL2 (VL1≦Vr<VL2), its is determined that the vehicle 10 is traveling at high velocity; in this case, VL1<VL2.

When the large-size external object Mn3 has collided against the vehicle 10 during medium-velocity travel, the sixth time point T6 is delayed by the first delay time Dt1 corresponding to a time length from the first reference time point T6*a* to a second reference time point T6*b* (i.e., Dt1=T6*b*–T6*a*).

If the second igniter 57 has been ignited or activated at the second reference time point T6*b* later than the first reference time point T6*a*, the inner pressure Pb is caused to vary in accordance with an inner pressure characteristic curve Bab, to be applied when an external object has collided against the vehicle 10 during medium-velocity travel, after the second reference time point T6*b* as indicated by a thin, broken line.

The inner pressure characteristic curve Bab, to be applied when an external object has collided against the vehicle 10 during medium-velocity travel, is a generally-mountain-shaped line in accordance with which the inner pressure Pb of the airbag 41 is caused to temporarily increase in level. According to the inner pressure characteristic curve Bab, the inner pressure Pb can be kept at a latter-period reference minimum level value P4*b*, necessary when the large-size external object Mn3 has collided against the vehicle 10 during medium-velocity travel, for a predetermined time period. This predetermined time period will hereinafter be referred to as "third impact cushioning zone Hia to be applied when an external object has collided during medium-velocity travel of the vehicle 10".

Further, when the large-size external object Mn3 has collided against the vehicle 10 during low-velocity travel, the sixth time point T6 is delayed by the second delay time Dt2 corresponding to a time length from the first reference time point T6*a* to a third reference time point T6*c* (i.e., Dt2=T6*c*–T6*a*); in this case, T6*b*<T6*c*.

If the second igniter 57 has been ignited at the third reference time point T6*c* later than the first reference time point T6*a*, the inner pressure Pb is caused to vary in an inner pressure characteristic curve Bac, to be applied when an external object has collided against the vehicle 10 during low-velocity travel, after the third reference time point T6*c* as indicated by a heavy, broken line.

The inner pressure characteristic curve Bac, to be applied when an external object has collided against the vehicle 10 during low-velocity travel, is a generally-mountain-shaped line in accordance with which the inner pressure Pb of the airbag 41 is caused to temporarily increase. According to the inner pressure characteristic curve Bac, the airbag inner pressure Pb can be kept at a latter-period reference minimum level value P4*c*, necessary when the large-size external object Mn3 has collided against the vehicle 10 during low-velocity travel, for a predetermined time period. This predetermined time period will hereinafter be referred to as "third impact cushioning zone Hic to be applied when an external object has collided during low-velocity travel of the vehicle 10".

The latter-period reference minimum level values P4*a*, P4*b* and P4*c* each represent a value that can not only prevent the large-size external object Mn3 from greatly bouncing off the airbag 41 but also prevent the head Hd3 of the large-size external object Mn3 from hitting the bottom 41*a* of the airbag 41. The latter-period reference minimum level values P4*a*, P4*b* and P4*c* are determined in view of the shapes, sizes, etc. of the front windshield 13 and adjoining parts and shape, size and degree of deformation, etc. of the airbag 41 in the vehicle 10 to which is applied the vehicular external airbag apparatus 40 of the present invention.

Further, the third impact cushioning zones Hib and Hic each represent a time range when the head Hd3 of the large-size external object Mn3 is estimated to hit the airbag 41, similarly to the third impact cushioning zone Hia.

Figure 9:
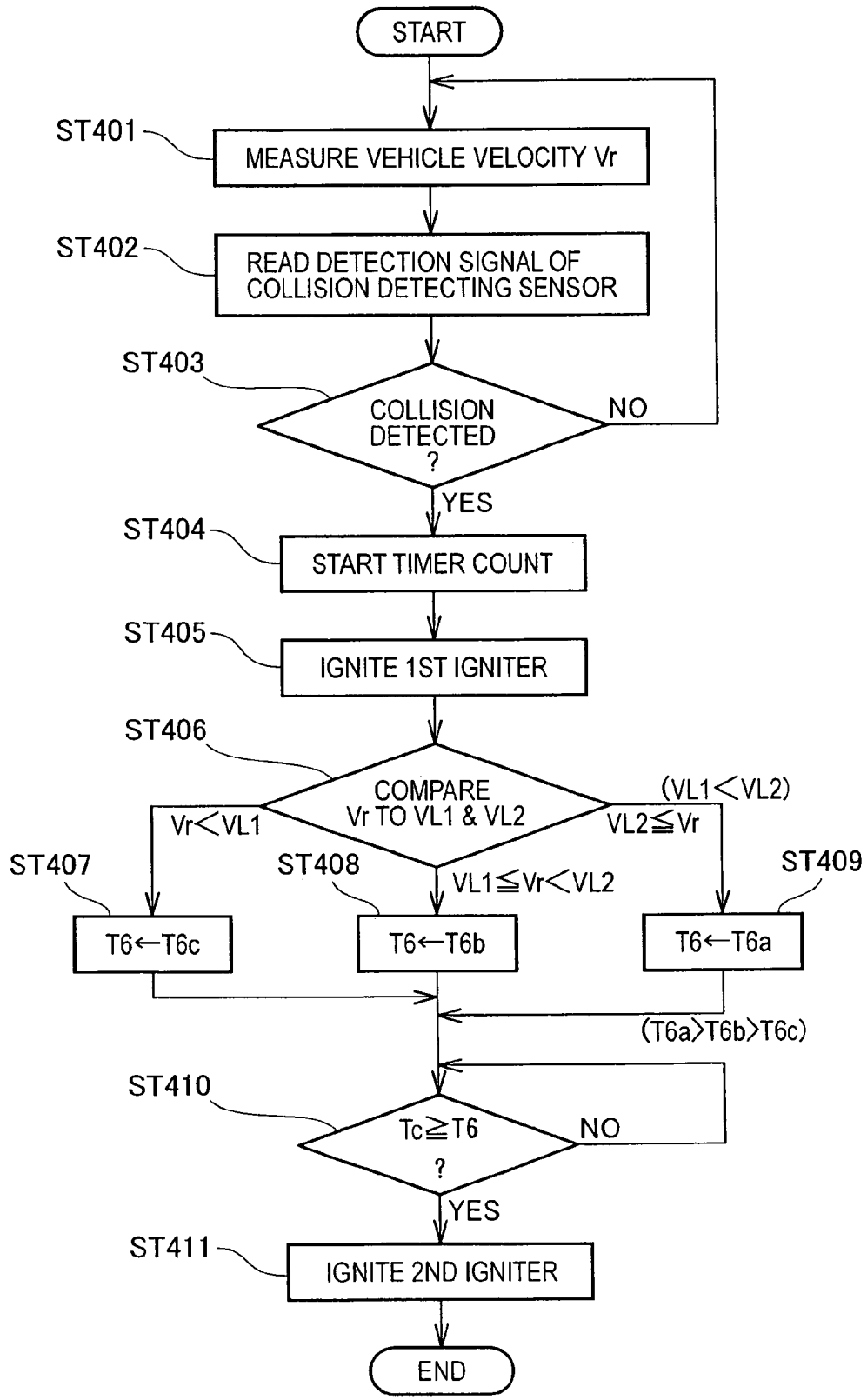
FIG. 9 is a flow chart showing an example control sequence executed by the control section in the vehicular external airbag apparatus.
Figure 10:
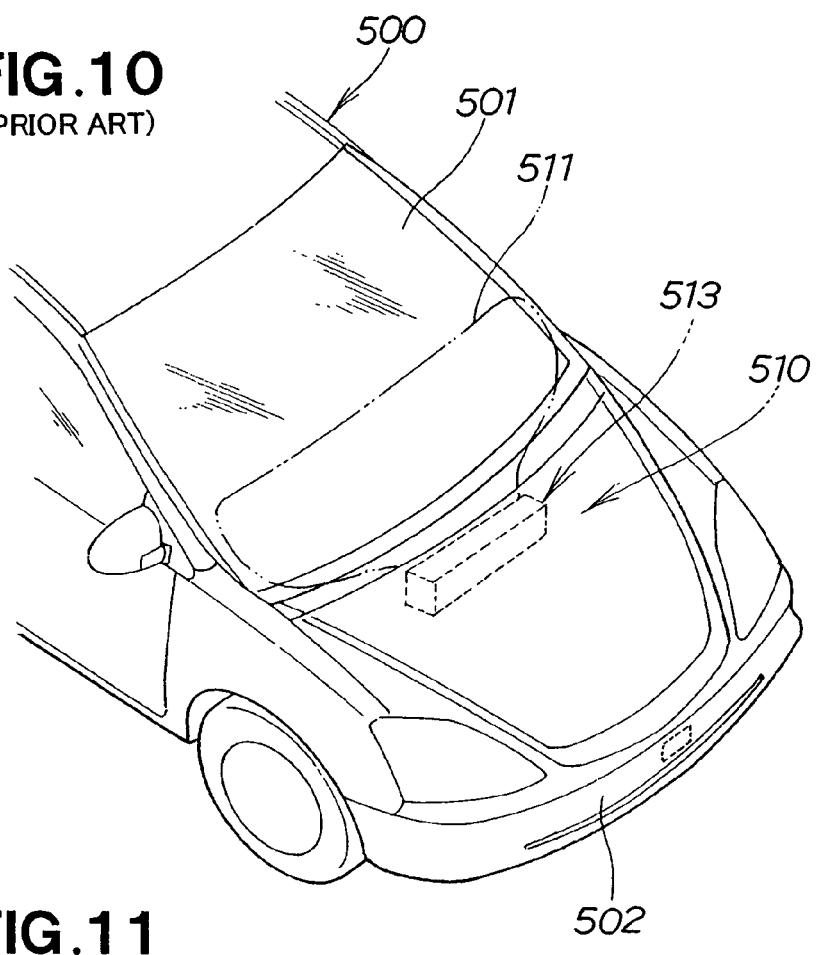
FIG. 10 is a perspective view of a vehicle equipped with a conventional vehicular external airbag apparatus.
Figure 11:
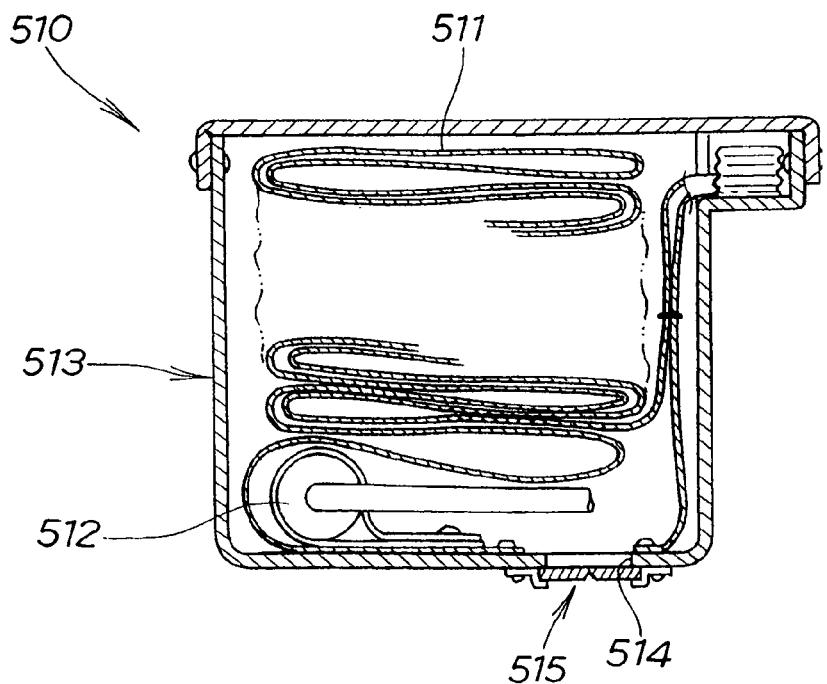
FIG. 11 is a sectional side view of the conventional vehicular external airbag apparatus.

FIG. 9 is a flow chart showing an example control sequence executed by the control section 33 of FIG. 3 for achieving the airbag inner pressure characteristics of FIG. 8, in the case where the control section 33 is implemented by a microcomputer. This control sequence is started up in response to turning-on of a not-shown ignition switch and brought to an end in response to turning-off of the not-shown ignition switch. The control sequence will be described with reference to FIG. 9 and FIGS. 3–5.

Step ST401: Current traveling velocity Vr of the vehicle 10 is measured, for example, via the vehicle velocity sensor 32.

Step ST402: Detection signal from the external-object-collision detecting sensor 31 is read into the control section 33. Note that the collision detecting sensor 31 generates a collision detection signal, upon detection of acceleration exceeding a preset reference acceleration value, assuming that an external object Mn has collided against a front portion of the vehicle body 11.

Step ST403: A determination is made, on the basis of the detection signal from the external-object-collision detecting sensor 31, as to whether any external object Mn has collided against a front portion of the vehicle body 11. With a NO determination, control reverts to step ST401, while, with a YES determination based on the collision detection signal from the collision detecting sensor 31, control proceeds to step ST404.

Step ST404: Elapsed time counted by a timer (timer counted time Tc) built in the control section 33 is rest to "0" (zero), and then the timer is caused to start counting the elapsed time from the collision (i.e., primary collision) of the external object Mn.

Step ST405: The first igniter 56 is ignited at the first time point (first ignition timing) T1.

Step ST406: The detected traveling velocity Vr is compared to the first reference velocity VL1 and second reference velocity VL2. The first reference velocity VL1 represents a reference low velocity value, while the second reference velocity VL2 represents a reference medium velocity value greater than the first reference velocity VL1 (VL1<VL2). Note that the traveling velocity Vr determined through a combination of steps ST401 and ST403 is a traveling velocity at the time point when the external object Mn has collided against the vehicle 10.

If the traveling velocity Vr is lower than the first reference velocity VL1 (Vr<VL1), i.e. if the external object Mn has collided against the vehicle 10 during low-velocity travel of the vehicle 10, control branches to step ST407.

If the traveling velocity Vr of the vehicle 10 is equal to or higher than the first reference traveling velocity VL1 but lower than the second reference traveling velocity VL2 (VL1≦Vr<VL2), i.e. if the external object Mn has collided against the vehicle 10 during medium-velocity travel of the vehicle 10, control proceeds to step ST408.

If the traveling velocity Vr is equal to or higher than the second reference velocity VL2 (VL2≦Vr), i.e. if the external object Mn has collided against the vehicle 10 during high-velocity travel of the vehicle 10, control branches to step ST409.

Step ST407: Time value of the sixth time point T6 (i.e., second ignition timing T6) is set to the predetermined third reference time value T6c.

Step ST408: Time value of the sixth time point T6 is set to the predetermined second reference time value T6b.

Step ST409: Time value of the sixth time point T6 is set to the predetermined first reference time value T6a.

In this case, the second reference time value T6b is greater than the first reference time value T6a, and the third reference time value T6c is greater than the second reference time value T6b (i.e., T6a<T6b<T6c). As apparent from the foregoing, the time value of the sixth time point T6 (i.e., second ignition timing T6) at step ST407 is greater, by a value "T6c–T6a", than that at step ST409, and the time value of the sixth time point T6 at step ST408 is greater by a value "T6b–T6a" than that at step ST409.

Step ST410: A determination is made as to whether the counted elapsed time Tc has passed the sixth time point T6 (reference time) (Tc≧T6). With a NO determination, the operation at step ST410 is repeated until a YES determination is made, while, with a YES determination, control proceeds to step ST411.

Step ST411: The second igniter 57 is ignited, after which control is brought to an end.

The foregoing description may be summarized as follows.

When any external object Mn (e.g., pedestrian) has collided against the vehicle 10 (primary collision), the control section 33 in the vehicular external airbag apparatus 40 causes the inflator 42 to produce the high-pressure gas at two separate ignition (or activation) timing in response to respective ignition instructions given from the control section 33, so that the airbag 41 with the vent hole 61 is inflated and deployed along the outer surfaces of the front windshield 13 and other parts adjoining the front windshield 13. In this way, the external object Mn, having collided against the vehicle 10, can be protected by the deployed airbag 41 when hitting (i.e., coming into the secondary collision against) another portion of the vehicle 10 (following the primary collision).

The inner pressure characteristics of the airbag 41 achieved in accordance with the present invention are made up primarily of a first or initial-stage inner pressure characteristic and second or subsequent-stage inner pressure characteristic following the first inner pressure characteristic as may be understood from FIG. 6. Namely, the first inner pressure characteristic and second inner pressure characteristic are achieved by the control section 33 performing first and second control in accordance with the inner pressure control characteristics set and stored in advance in the manner as described above in relation to FIG. 6.

According to the first control, as seen from FIGS. 3–5 and 8, when the predetermined small-size external object Mn1 has collided against the vehicle 10 and once the head Hd1 of the small-size external object Mn1 hits the deployed airbag 41 at a predetermined reference high velocity, the inner pressure Pb of the inflated airbag 41 is set to the first inner pressure characteristic such that the inner pressure Pb takes the maximum pressure P1 capable of not only preventing the external object Mn1 from greatly bouncing off the airbag 41 but also preventing the head Hd1 of the external object Mn1 from hitting the bottom 41a of the airbag 41 and is then caused to gradually decrease in level from the maximum pressure P1. Namely, the inner pressure Pb of the airbag 41 is controlled, by the first control, to assume the aforementioned first inner pressure characteristic.

It has previously been known or confirmed that the head Hd1 of the small-size external object Mn1, having a small height St1 and weight, comes into the secondary collision at a predetermined reference high velocity. By setting the inner pressure Pb of the airbag 41 such that the inner pressure Pb when the head Hd1 of the small-size external object Mn1 has hit the airbag 41 takes the maximum level value P1, it is possible to sufficiently cushion the impact on the external object Mn1 having hit the airbag 41.

According to the second control, as seen from FIGS. 3–5 and 8, when the predetermined large-size external object Mn3 has collided against the vehicle and once the head Hd3 of the large-size external object Mn3 hits the deployed airbag 41 at time point T6, the inner pressure Pb is set to the second inner pressure characteristic such that it is kept for a predetermined time period at the low level value P4 capable of not only preventing the external object Mn3 from greatly bouncing off the airbag 41 but also preventing the head Hd3 of the external object Mn3 from hitting the bottom 41a of the airbag 41. Namely, the inner pressure Pb of the airbag 41 is controlled, by the second control, to assume the aforementioned second inner pressure characteristic.

The medium-size external object Mn2 and large-size external object Mn3 are each taller and heavier than the small-size external object Mn1. Thus, the time point at which the external object Mn2 or Mn3 hits the airbag 41 tends to be later than the time point at which the small-size external object Mn1 hits the airbag 41. In view of such a tendency, the inventive control starts keeping the inner pressure Pb at the predetermined low level value at a possible time later than the time point at which the small-size external object collides against the vehicle 10, so that it can sufficiently lessen the impact on the medium- and large-size external objects Mn2 and Mn3.

In the above-described manner, the present invention can sufficiently lessen the impact on all of the small-, medium- and large-size external objects Mn1, Mn2 and Mn3. Thus, the present invention can versatilely sufficiently lessen the impact on the external objects Mn1, Mn2 and Mn3 even where there exist great differences in size and colliding velocity among the external objects Mn1, Mn2 and Mn3 coming into the secondary collision against the inflated and deployed airbag 41.

The control section 33 issues the first igniting instruction at the first time point (i.e., first ignition timing) Ti to inflate and deploy the airbag 41 in such a manner that the inner pressure Pb of the airbag 41 is controlled to assume the aforementioned first inner pressure characteristic. Then, the control section 33 issues the second igniting instruction at the sixth time point (i.e., second ignition timing) T6 in such a manner that the inner pressure Pb of the airbag 41 is controlled to assume the aforementioned second inner pressure characteristic. Further, in the case where the condition that the traveling velocity Vr of the vehicle 10 detected (at step ST401 of FIG. 9) at the time point when any external object Mn has collided against the vehicle 10 (step ST403 of FIG. 9) is lower than the preset reference traveling velocity VL1 or VL2 has been satisfied (step ST406 of FIG. 9), the control section 33 controls the second ignition timing T6 (for issuing the second ignition instruction) to be delayed, by the determined delay time Dt1 or Dt2, as compared to the case where the condition has not been satisfied (step ST407 or ST408 and step ST410 of FIG. 9).

Namely, when the traveling velocity Vr of the vehicle 10 detected at the time point when the external object Mn has collided against the vehicle 10 is lower than the preset reference traveling velocity VL1 or VL2, the control section 33 delays the second ignition timing T6 (for issuing the second ignition instruction), by the determined delay time (first or second delay time Dt1 or Dt2), behind the second ignition timing T6 to be applied in the case where the detected traveling velocity Vr of the vehicle 10 is equal to or higher than the preset reference traveling velocity VL1 or VL2.

Because only the second ignition timing T6 for issuing the second ignition instruction is varied here in accordance with the detected traveling velocity Vr, sufficient protection performance of the vehicular external airbag apparatus 40 can be secured reliably not only during high-velocity travel but also during low-velocity travel. Namely, even during low-velocity travel, the desired second inner pressure for the inflated and deployed airbag 41 can be maintained through the second control.

Further, because the first ignition timing T1 for issuing the first ignition instruction is constant irrespective of the traveling velocity Vr of the vehicle 10, the airbag 41 can be promptly inflated and deployed upon primary collision of an external object Mn against the vehicle 10 so that the above-mentioned first or initial-stage inner pressure characteristic can be secured. Therefore, irrespective of behavior of the external object Mn coming into the secondary collision, even more sufficient protection performance of the vehicular external airbag apparatus 40 can be secured reliably.

As apparent from the foregoing, the impact on the external object Mn colliding against the vehicle 10 can be sufficiently lessened irrespective of the traveling velocity Vr at the time of the collision.

The vehicular external airbag apparatus 40 of the present invention should not be construed as limited to the arrangements that the airbag 41 covers the upper surface of the cowl top 21, front surfaces of the front pillars 12 and front windshield 13; for example, the front surfaces of the front pillars 12 and front windshield 13 may be covered with a plurality of the airbags 41 provided in corresponding relation thereto.

The "reference velocities" to be used for comparison with the traveling velocity Vr at the time of collision of an external object Mn against the vehicle 10 are not limited to two reference velocity values, i.e. first and second reference velocities VL1 and VL2; for example, just one or more than two reference velocity values may be set, in accordance with which the number and time values of the predetermined delay times (e.g., first and second delay times Dt1 and Dt3) may be set as desired.

Further, there may be prestored a map defining relationship between "various possible velocities of the vehicle 10 at the time of collision of external objects Mn against the vehicle 10" and "delay time values", so as to use the map to determine a suitable delay time value corresponding to the current traveling velocity Vr.

The vehicular external airbag apparatus 40 of the present invention is particularly suitable for use on or around the front pillars of passenger cars, such as sedans or wagons, having a relatively short front nose section.

Obviously, various minor changes and modifications of the present invention are possible in the light of the above teaching. It is therefore to be understood that within the scope of the appended claims the invention may be practiced otherwise than as specifically described.

What is claimed is:

1. A method for setting, by use of a plurality of dummies of different sizes, an inner pressure of a vehicular external airbag deployed along an outer surface of at least a front windshield of a vehicle, said method comprising:

a first step of, when a small-size dummy of the plurality of dummies has collided against the vehicle and once a head of the small-size dummy hits the deployed airbag at a predetermined velocity, setting the inner pressure of the deployed external airbag to a characteristic such that the inner pressure takes a predetermined maximum level value capable of not only preventing the small-size dummy from bouncing off said external airbag but also preventing the head of the small-size dummy from hitting a bottom of said external airbag; and a second step of, when a medium-size dummy of the plurality of dummies collided against the vehicle, setting the inner pressure of the deployed external airbag to a characteristic such that the inner pressure decreases away from the predetermined maximum level value at a pre-determined decrease rate to prevent the medium-size dummy from bouncing off said external airbag.

2. A method according to claim 1, further comprising a third step of, when a large-size dummy of the plurality of dummies, greater in size than the small- and medium-size dummies, collided against the vehicle and once a head of the large-size dummy hits the deployed external airbag at a predetermined velocity, setting the inner pressure of the deployed external airbag to a characteristics such that the inner pressure is kept, for a predetermined time period, at a predetermined level value smaller than the predetermined maximum level value and capable of not only preventing the large-size dummy from bouncing off the external airbag but also preventing the head of the large-size dummy from hitting the bottom of said external airbag.

3. A vehicular external airbag system comprising:

an inner pressure control characteristic setting unit storing therein predetermined inner pressure control characteristics to control an inner pressure of a vehicular external airbag deployed along an outer surface of at least a front windshield of a vehicle; and a vehicular external airbag apparatus comprising:

said external airbag;

an inflator for inflating and deploying said external airbag upon detection of a collision of an external object against the vehicle; and a control section, wherein, when a small-size external object collided against the vehicle and once a part of the small-size external object hits the deployed external airbag at a predetermined velocity, said control section performs first control, in accordance with the inner pressure control characteristics stored in said inner pressure control characteristic setting unit, such that said inflator is ignited at predetermined first timing and the inner pressure of the deployed external airbag takes a predetermined maximum level value capable of not only preventing the small-size external object from bouncing off said external airbag but also preventing the part of the small-size external object from hitting a bottom of said external airbag, and when a large-size external object, greater in size than the small-size external object, collided against the vehicle and once a part of the large-size external object hits the deployed external airbag at a predetermined velocity, said control section performs second control, in accordance with the inner pressure control characteristics stored in said inner pressure control characteristic setting unit, such that said inflator is ignited at predetermined second timing later than said first timing and the inner pressure is kept, for a predetermined time period, at a predetermined level value smaller than the maximum level value and capable of not only preventing the large-size external object from bouncing off said external airbag but also preventing the part of the large-size external object hitting the bottom of said external airbag.

4. A vehicular external airbag system according to claim 3 wherein, when a traveling velocity of the vehicle detected when the external object collided against the vehicle is lower than a predetermined reference velocity, said control section controls said second timing to be delayed by a predetermined time as compared to when said traveling velocity of the vehicle detected is not lower than the predetermined reference velocity.

* * * * *